(12) United States Patent
Oteri et al.

(10) Patent No.: US 12,255,850 B2
(45) Date of Patent: Mar. 18, 2025

(54) BASIC SERVICE SET (BSS) MANAGEMENT IN A WIRELESS LOCAL AREA NETWORK (WLAN)

(71) Applicant: InterDigital Patent Holdings, Inc., Wilmington, DE (US)

(72) Inventors: Oghenekome Oteri, San Diego, CA (US); Yuan Sheng Jin, Sunnyvale, CA (US); Hanqing Lou, Syosset, NY (US); Xiaofei Wang, Cedar Grove, NJ (US); Robert L. Olesen, Huntington, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/542,140

(22) PCT Filed: Jan. 8, 2016

(86) PCT No.: PCT/US2016/012674
§ 371 (c)(1),
(2) Date: Jul. 7, 2017

(87) PCT Pub. No.: WO2016/112306
PCT Pub. Date: Jul. 14, 2016

(65) Prior Publication Data
US 2018/0270038 A1    Sep. 20, 2018

Related U.S. Application Data

(60) Provisional application No. 62/101,645, filed on Jan. 9, 2015.

(51) Int. Cl.
*H04L 5/00* (2006.01)
*H04W 24/02* (2009.01)
(Continued)

(52) U.S. Cl.
CPC .......... *H04L 5/0073* (2013.01); *H04L 5/0037* (2013.01); *H04L 5/0044* (2013.01);
(Continued)

(58) Field of Classification Search
CPC ... H04L 5/0073; H04L 5/0044; H04L 5/0094; H04L 5/0037; H04L 5/0007;
(Continued)

(56) References Cited

U.S. PATENT DOCUMENTS 9,942,193 B1 * 4/2018 Chu ...................... H04W 84/12
2006/0114928 A1 * 6/2006 Utsunomiya ..... H04W 74/0875
370/448
(Continued)

FOREIGN PATENT DOCUMENTS

| EP | 1931086 B1 | 2/2015 |
|----|------------|--------|
| WO | WO 2014/110397 A1 | 7/2014 |
| WO | WO 2015/003057 A2 | 1/2015 |

OTHER PUBLICATIONS

Original U.S. Appl. No. 62/098,823, filed Dec. 31, 2014 (Year: 2014).*

(Continued)

*Primary Examiner* — Un C Cho
*Assistant Examiner* — Rasha K Fayed
(74) *Attorney, Agent, or Firm* — Volpe Koenig

(57) ABSTRACT

An access point (AP) may determine that a basic service set (BSS) color of an overlapping BSS (OBSS) associated with a neighboring AP is a same color as a BSS color of the AP. A BSS color change announcement message may be generated having BSS color information and a color switching time. The BSS color information may indicate a BSS color for the AP and the color switching time may indicate a time until the AP switches to the BSS color.

10 Claims, 26 Drawing Sheets

(51) Int. Cl.
*H04W 72/12* (2023.01)
*H04W 72/541* (2023.01)
*H04W 84/12* (2009.01)
*H04W 88/06* (2009.01)

(52) U.S. Cl.
CPC ........... *H04L 5/0094* (2013.01); *H04W 24/02* (2013.01); *H04W 72/1215* (2013.01); *H04W 72/541* (2023.01); *H04W 88/06* (2013.01); *H04L 5/0007* (2013.01); *H04W 84/12* (2013.01)

(58) Field of Classification Search
CPC ..... H04L 5/0091; H04L 41/0859; H04L 1/00; H04L 12/24; H04L 27/0006; H04L 27/0602; H04W 72/082; H04W 72/1215; H04W 72/046; H04W 72/0453; H04W 72/0426; H04W 72/08; H04W 72/12; H04W 72/04; H04W 72/1289; H04W 88/06; H04W 88/08; H04W 24/02; H04W 24/10; H04W 84/12; H04W 48/16; H04W 48/14; H04W 48/10; H04W 28/04; H04W 28/18; H04W 28/06; H04W 74/002; H04W 74/004; H04W 74/0875; H04W 74/0891; H04W 74/0808; H04W 74/0816; H04W 74/085
USPC ....... 370/329, 328, 252, 330, 254, 331, 338, 370/469
See application file for complete search history.

(56) References Cited

U.S. PATENT DOCUMENTS

| | | | | |
|---|---|---|---|---|
| 2008/0026773 A1* | 1/2008 | Hyun | H04W 64/00 | 455/456.1 |
| 2009/0005046 A1* | 1/2009 | Won | H04W 36/04 | 455/436 |
| 2010/0103850 A1* | 4/2010 | Gossain | H04W 72/0426 | 370/312 |
| 2011/0110349 A1* | 5/2011 | Grandhi | H04W 52/04 | 370/338 |
| 2012/0051312 A1* | 3/2012 | Noh | H04W 4/00 | 370/329 |
| 2012/0257574 A1* | 10/2012 | Seok | H04W 72/082 | 370/328 |
| 2012/0311173 A1* | 12/2012 | Agarwal | H04W 36/18 | 709/231 |
| 2013/0279381 A1* | 10/2013 | Sampath | H04W 48/08 | 370/336 |
| 2014/0010223 A1* | 1/2014 | Wang | H04W 76/11 | 370/338 |
| 2014/0016568 A1* | 1/2014 | Koskela | H04W 52/0219 | 370/329 |
| 2014/0112175 A1* | 4/2014 | Pantelidou | H04W 28/26 | 370/252 |
| 2015/0023335 A1* | 1/2015 | Vermani | H04L 27/261 | 370/338 |
| 2015/0049701 A1* | 2/2015 | Tian | H04L 1/1614 | 370/329 |
| 2015/0110093 A1* | 4/2015 | Asterjadhi | H04W 74/08 | 370/338 |
| 2015/0124776 A1* | 5/2015 | Lee | H04W 76/16 | 370/331 |
| 2015/0249529 A1* | 9/2015 | Zheng | H04L 1/1896 | 370/336 |
| 2015/0249953 A1* | 9/2015 | Kim | H04W 48/16 | 370/254 |
| 2015/0264617 A1* | 9/2015 | Choudhury | H04W 16/14 | 370/332 |
| 2015/0282043 A1* | 10/2015 | Fang | H04W 72/542 | 370/329 |
| 2015/0312941 A1* | 10/2015 | Oh | H04W 74/0816 | 370/338 |
| 2015/0351115 A1* | 12/2015 | Jeon | H04W 16/14 | 455/450 |
| 2015/0358904 A1* | 12/2015 | Kwon | H04W 74/0808 | 370/252 |
| 2015/0365973 A1* | 12/2015 | Choi | H04W 74/006 | 370/336 |
| 2016/0007247 A1* | 1/2016 | Lee | H04W 36/0072 | 370/331 |
| 2016/0056943 A1* | 2/2016 | Stacey | H04W 88/02 | 370/338 |
| 2016/0135225 A1* | 5/2016 | Kwon | H04W 74/0808 | 370/329 |
| 2016/0142980 A1* | 5/2016 | Lee | H04W 52/38 | 370/336 |
| 2016/0198358 A1* | 7/2016 | Rong | H04W 72/1268 | 370/235 |
| 2016/0205606 A1* | 7/2016 | Park | H04W 52/0216 | 455/436 |
| 2016/0242210 A1* | 8/2016 | Seok | H04W 28/18 | |
| 2016/0323853 A1* | 11/2016 | Kim | H04W 72/12 | |
| 2017/0019927 A1* | 1/2017 | Kim | H04W 72/04 | |
| 2017/0223734 A1* | 8/2017 | Lin | H04W 72/23 | |
| 2017/0264475 A1* | 9/2017 | Son | H04L 1/0063 | |
| 2017/0289987 A1* | 10/2017 | Seok | H04W 74/00 | |
| 2017/0311352 A1* | 10/2017 | Lv | H04W 74/0808 | |

OTHER PUBLICATIONS

English translation of U.S. Appl. No. 62/098,823, filed Dec. 31, 2014 (Year: 2014).*
Aboul-Magd, Osama, "802.11 HEWSG Proposed Par", IEEE P802.11 Wireless LANs, IEEE 802.11-14/0165r1, Mar. 17, 2014, 6 pages.
Aboul-Magd, Osama, "IEEE 802.11 HEW SG Proposed CSD", IEEE P802.11 Wireless Lans, IEEE 802.11-14/0169r1, Mar. 18, 2014, 6 pages.
Chen et al., "MAC and PHY Proposal for 802.11af", IEEE 802.11-10/0258r0, Mar. 2010, 23 pages.
Choudhury et al., "Impact of CCA Adaptation on Spatial Reuse in Dense Residential Scenario", IEEE 802.11-14/0861r0, Jul. 14, 2014, 11 pages.
Halasz, Dave, "Sub 1 GHz License-Exempt PAR and 5C", IEEE 802.11-10/0001r13, Jul. 15, 2010, 8 pages.
Huang et al., "The Effect of Preamble Error Model on MAC Simulator", IEEE 802.11-14/1187r1, Sep. 11, 2014, 17 pages.
IEEE, "Part 11: Wireless LAN Medium Access Control (MAC) and Physical Layer (PHY) Specifications, Amendment 5: Enhancements for Very High Throughput for Operation in Bands Below 6 GHz", IEEE P802.11ac™/D1.0, May 2011, 263 pages.
IEEE, "Part 11: Wireless LAN Medium Access Control (MAC) and Physical Layer (PHY) Specifications-Amendment 2: Fast Basic Service Set (BSS) Transition", IEEE Std 802.11r™-2008, Jul. 15, 2008, 126 pages.
IEEE, "Part 11: Wireless LAN Medium Access Control (MAC) and Physical Layer (PHY) Specifications", IEEE Std 802.11™-2012, Mar. 29, 2012, 2793 pages.
IEEE, "Part 11: Wireless LAN Medium Access Control (MAC) and Physical Layer (PHY) Specifications, Amendment 6: Sub 1 GHz License Exempt Operation", IEEE P802.11ah™M/D3.0, Oct. 2014, 611 pages.
IEEE, "Part 11: Wireless LAN Medium Access Control (MAC) and Physical Layer (PHY) Specifications, Amendment 3: Enhancements for Very High Throughput in the 60 GHZ Band", IEEE 802.11ad, 2012, 628 pages.
Ishihara et al., "Consideration of Asynchronous Interference in OBSS Environment", IEEE, 11-14/1148r1, Sep. 16, 2014, 10 pages.
Jiang et al., "System Level Simulations on Increased Spatial Reuse", IEEE 802.11-14/0372r0, Mar. 17, 2014, 8 pages.
Perahia et al., "HEW Usage Scenarios and Applications", IEEE 802.11-13/0514r0, May 13, 2013, 23 pages.
Porat et al., "Improved Spatial Reuse Feasibility-Part I", IEEE 802.11-14/0082r0, Jan. 20, 2014, 19 pages.

(56) References Cited

OTHER PUBLICATIONS

Son et al., "Further Considerations on Enhanced CCA for 11ax", IEEE 802.11-14/0847r1, Jul. 15, 2014, 12 pages.

Tandai et al., "Interferential Packet Detection Scheme for a Solution to Overlapping BSS Issues in IEEE 802.11 WLANs", 17th Annual IEEE International Symposium on Personal, Indoor, and Mobile Radio Communications, Sep. 2006, 5 pages.

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D4.0 (Jan. 2015).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

Jemili et al., "Collision Aware Coloring Algorithm for wireless sensor networks," International Wireless Communications and Mobile Computing Conference (Jul. 2013).

Zheng et al., "Applying Graph Coloring in Resource Coordination for a High-density Wireless Environment," IEEE International Conference on Computer and Information Technology (Jul. 2008).

Fischer, "LB200 Proposed Resolutions for Subclause 9.17b," IEEE P802.11 Wireless LANs, IEEE 802.11-14/0611r1 (May 2014).

Fischer et al., "CID 205 BSSID Color Bits," IEEE 802.11-13/1207r0 (Sep. 16, 2013).

Kang et al., "Inter-BSS interference in WLANs," IEEE 802.11-14/1178r2 (Sep. 15, 2014).

Kang et al., "Inter-BSS interference in WLANs," IEEE 802.11-14/1178r1 (Sep. 15, 2014).

\* cited by examiner

| TWT Grouping Support | BDT Capable | Color | Reserved | Reserved | Reserved |
|---|---|---|---|---|---|
| 1 | 1 | 3 | 1 | 1 | 1 |

B64  B65  B66  B68  B69  B70  B71

Bits:

FIG. 3

| B0 | B1 | B2 | B3 B4 | B5 B6 B7 | B15 | B16 | B17 B18 B19 | B22 | B23 |
|---|---|---|---|---|---|---|---|---|---|
| Reserved | STBC | Uplink Indication | BW | Nsts | ID | SGI | Coding | MCS | Smoothing |

FIG. 4

| (Sub)Element ID | Length | New BSS Color | Switching Time |

FIG. 24

BASIC SERVICE SET (BSS) MANAGEMENT IN A WIRELESS LOCAL AREA NETWORK (WLAN)

CROSS REFERENCE TO RELATED APPLICATION

This application is the National Stage Entry under 35 U.S.C. § 371 Patent Cooperation Treaty Application No. PCT/US2016/012674, filed Jan. 8, 2016, which claims the benefit of U.S. provisional application No. 62/101,645 filed Jan. 9, 2015, the contents of which are hereby incorporated by reference herein.

BACKGROUND

With rapid increase in the number of Institute of Electrical and Electronics Engineers (IEEE) 802.11 devices (stations (STAs) and/or access points (APs)) being added to wireless local area network (WLAN) based networks, dense WLAN deployments have become a commonplace. Such dense WLAN deployments face significant performance issues due to factors including, for example, interference, congestion, low throughput, etc.

Existing WLAN features, e.g., for basic service sets (BSSs), for example, as used in IEEE 802.11ah may not be well suited for such dense WLAN deployments. Enhanced BSS color format and associated mechanisms may be needed to improve performance of such dense WLAN deployments.

SUMMARY

Systems, methods and instrumentalities are disclosed that may improve performance in densely deployed WLANs. A station (STA) in its own basic service set (BSS) may receive a transmission frame from an overlapping BSS (OBSS). The STA may decode a preamble of the received transmission frame. Using the decoded preamble (e.g., decoded preamble only), the STA may determine OBSS information and/or a transmit scheme associated with the OBSS. The transmit scheme may include one or more of orthogonal frequency divisional multiplexing (OFDM), orthogonal frequency divisional multiple access (OFDMA), BSS silencing, interference avoidance with sectored transmission, or OFDMA with band silencing. The transmission frame may include a transmit node or BSS identification. The transmit node or BSS identification may indicate whether the transmit node or BSS identification is for a downlink transmission or an uplink transmission.

The determined transmit scheme associated with the OBSS may be orthogonal frequency divisional multiple access (OFDMA). In such case, the STA, in its own BSS, may indicate to its associated access point (AP) that one or more channels or sub-channels that are available for transmission, and/or one or more channels or sub-channels that are not available for transmission. The STA may send the channel information to the AP in its own BSS, e.g., in response to a transmission schedule and/or using an uplink request.

The determined transmit scheme associated with the OBSS may be orthogonal frequency divisional multiplexing (OFDM). In such case, the STA may determine that a channel is not available for transmission. The STA may set the channel to busy, for example, when the OBSS information indicates that the STA is not robust to OBSS interference. The STA may set the channel to idle, for example, when the OBSS information indicates that the STA is robust to OBSS interference. The STA may transmit on the channel set to idle.

BRIEF DESCRIPTION OF THE DRAWINGS

A more detailed understanding may be had from the following description, given by way of example in conjunction with the accompanying drawings.

FIG. 3 illustrates example of sub 1 GHz (SIG) capabilities info field.

FIG. 4 illustrates an example of SIG-1 frame structure.

FIG. 24 illustrates an example of a change of color announcement (Sub)Element

DETAILED DESCRIPTION

A detailed description of illustrative embodiments will now be described with reference to the various figures.

Although this description provides a detailed example of possible implementations, it should be noted that the details are intended to be exemplary and in no way limit the scope of the application.

Figure 1:
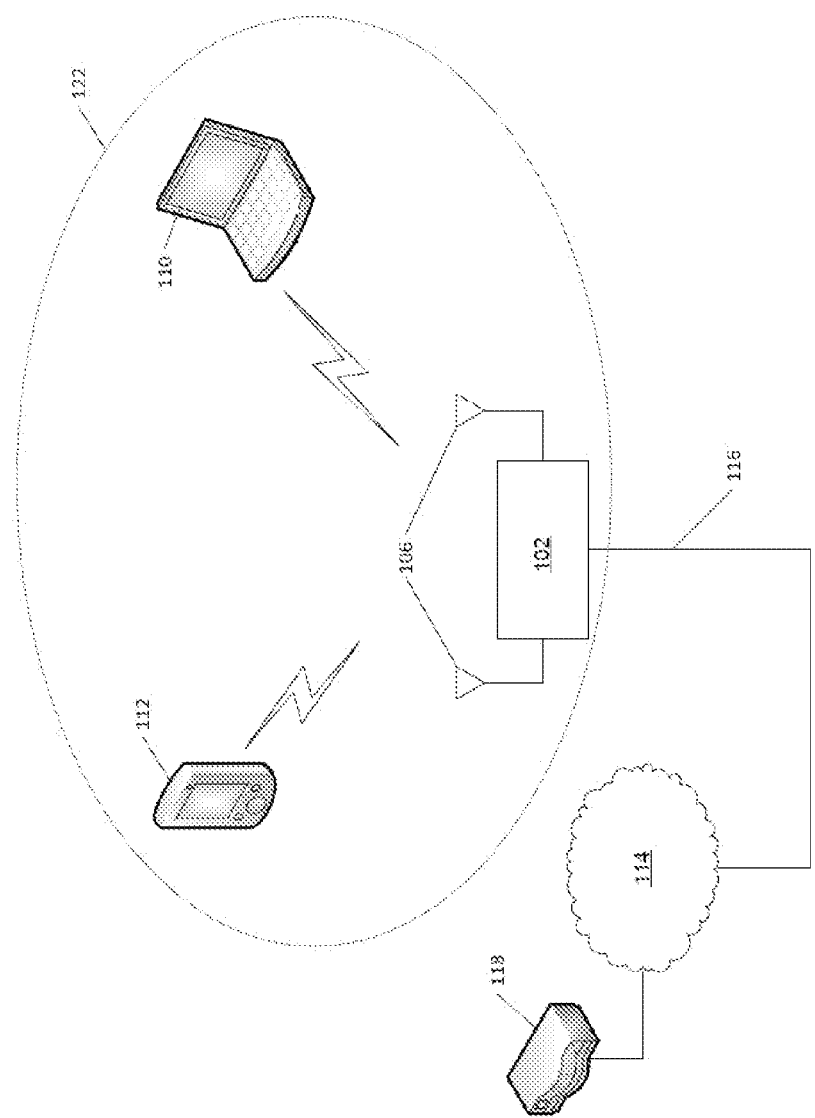
FIG. 1 illustrates an exemplary Wireless Local Area Network (WLAN) system.

A WLAN in infrastructure basic service set mode may have an access point (AP) for the basic service set (BSS) and one or more stations (STAs) associated with the AP as illustrated by example in FIG. 1. The AP may have access or interface to a Distribution System (DS) or another type of wired/wireless network that may carry traffic in and out of the BSS. Traffic to STAs may originate from outside the BSS, may arrive through the AP and may be delivered to the STAs. The traffic originating from STAs to destinations outside the BSS may be sent to the AP to be delivered to the respective destinations. Traffic between STAs within the BSS may be sent through the AP where the source STA may send traffic to the AP and the AP may deliver the traffic to the destination STA. The traffic between STAs within a BSS may be peer-to-peer traffic. Such peer-to-peer traffic may be sent directly between the source and destination STAs, e.g., with a direct link setup (DLS) using an IEEE 802.11e DLS or an IEEE 802.11z tunneled DLS (TDLS). A WLAN using an Independent BSS (IBSS) mode may have no APs, and the STAs may communicate directly with each other. This mode of communication may be an ad-hoc mode.

FIG. 1 illustrates exemplary wireless local area network (WLAN) devices. One or more of the devices may be used to implement one or more of the features described herein. The WLAN may include, but is not limited to, access point (AP) 102, station (STA) 110, and STA112. STA110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA110, and STA112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA110) may have traffic intended for a destination STA (e.g., STA112)). STA110 may send the traffic to AP 102, and, AP 102 may send the traffic to STA112.

A WLAN may operate in an ad-hoc mode. The ad-hoc mode WLAN may be referred to as independent basic service set (IBBS). In an ad-hoc mode WLAN, the STAs may communicate directly with each other (e.g., STA110 may communicate with STA112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 1), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processer. The processer may communicate with one or more entities of memory, e.g., via a system bus, directly, etc.

A WLAN in infrastructure basic service set (IBSS) mode may have an access point (AP) for the basic service set (BSS) and one or more stations (STAs) associated with the AP. The AP may have access or interface to a distribution system (DS) or another type of wired/wireless network that may carry traffic in and out of the BSS. Traffic to STAs may originate from outside the BSS, may arrive through the AP and may be delivered to the STAs. Traffic originating from STAs to destinations outside the BSS may be sent to the AP to be delivered to the respective destinations. Traffic between STAs within the BSS may be sent through the AP where the source STA may send traffic to the AP and the AP may deliver the traffic to the destination STA. Traffic between STAs within a BSS may be peer-to-peer traffic. Such peer-to-peer traffic may be sent directly between the source and destination STAs, e.g., with a direct link setup (DLS) using an IEEE 802.11e DLS or an IEEE 802.11z tunneled DLS (TDLS). A WLAN using an independent BSS (IBSS) mode may have no APs, and the STAs may communicate directly with each other. This mode of communication may be an ad-hoc mode.

Using the IEEE 802.11 infrastructure mode of operation, the AP may transmit a beacon on a fixed channel, usually the primary channel. This channel may be 20 MHz wide, and may be the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, may sense the primary channel. If the channel is detected to be busy, the STA may back off. If the channel is detected to be free, the STA may acquire the channel and transmit data.

In IEEE 802.11n, High Throughput (HT) STAs may use a 40 MHz wide channel for communication. This may be achieved, for example, by combining the primary 20 MHz channel, with an adjacent 20 MHz channel to form a 40 MHz wide contiguous channel.

In IEEE 802.11ac, very high throughput (VHT) STAs may support, e.g., 20 MHz, 40 MHz, 80 MHz, and/or 160 MHz wide channels. The 40 MHz, and 80 MHz, channels may be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration). For the 80+80 configuration, the data, after channel encoding, may be passed through a segment parser that may divide it into two streams. Inverse fast Fourier transform (IFFT), and time domain, processing may be done on each stream separately. The streams may be mapped onto the two channels, and the data may be transmitted. At the receiver, this mechanism may be reversed, and the combined data may be sent to the MAC.

IEEE 802.11af and IEEE 802.11ah may operate in the sub 1 GHz band. For these specifications the channel operating bandwidths may be reduced relative to those used in IEEE 802.11n, and IEEE 802.11ac. IEEE 802.11af may operate in the TV White Space (TVWS) spectrum, and IEEE 802.11ah may support 1 MHz, 2 MHz, 4 MHz, 8 MHz, and/or 16 MHz bandwidths, e.g., using non-TVWS spectrum. For example, 802.11ah may support Meter Type Control (MTC) devices in a macro coverage area. MTC devices may have limited capabilities for example, including support for limited bandwidths and a long battery life.

WLAN systems may support multiple channels and/or channel widths, such as 802.11n, 802.11ac, 802.11af, and 802.11ah, and a channel that may be designated as the primary channel. The primary channel may have a bandwidth equal to the largest common operating bandwidth supported by some or all STAs in the BSS. The bandwidth of the primary channel may be limited by the STA (e.g., of some or all STAs in operating in a BSS) that may support the smallest bandwidth operating mode. In the example of 802.11ah, the primary channel may be 1 MHz wide if there are STAs (e.g., MTC type devices) that supports (e.g., only supports) a 1 MHz mode, for example, even if the AP, and other STAs in the BSS, may support a 2 MHz, 4 MHz, 8 MHz, 16 MHz, or other channel bandwidth operating modes. Some or all carrier sensing, and NAV settings, may depend on the status of the primary channel, such as if the primary channel is busy, for example, due to a STA supporting (e.g., only) a 1 MHz operating mode transmitting to the AP, the entire available frequency bands may be considered busy even though majority of it may stays idle and/or available.

In the United States, for example, the available frequency bands that may be used by IEEE 802.11ah may be from 902 MHz to 928 MHz. In Korea, for example, it may be from 917.5 MHz to 923.5 MHz. In Japan, for example, it may be from 916.5 MHz to 927.5 MHz. The total bandwidth available for IEEE 802.11ah may be 6 MHz to 26 MHz may depend on the country code.

Figure 2:
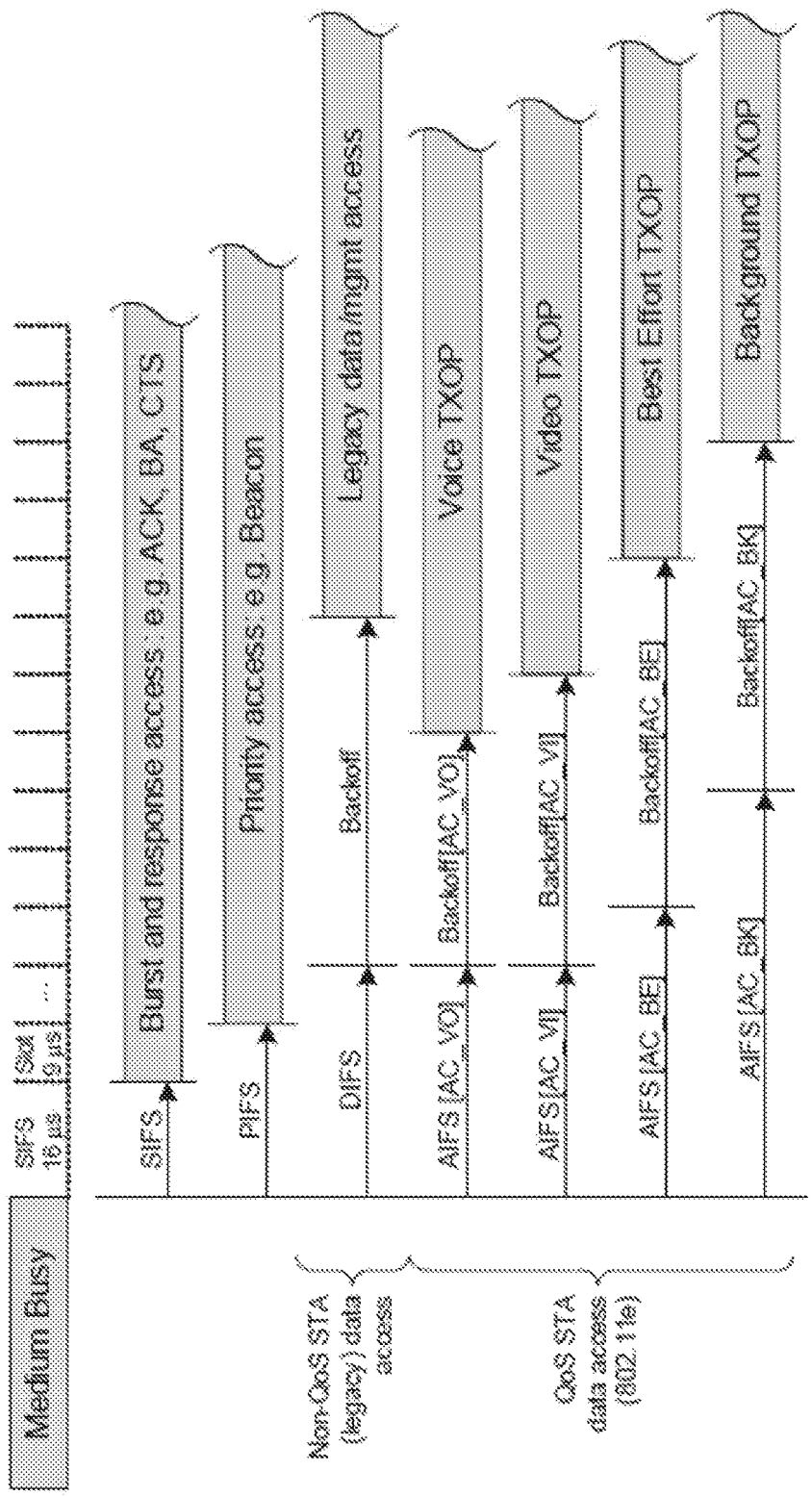
FIG. 2 illustrates an example of enhanced distributed channel access (EDCA) operation.

Enhanced distributed channel access (EDCA) may be an extension of the distributed coordination function (DCF) introduced in the 802.11 standard to support prioritized quality of service (QoS). FIG. 2 illustrates the operation of EDCA, for example, as provided in IEEE 802.11n standard.

A point coordination function (PCF) may use contention-free channel access. PCF may support time-bounded services and polling by an AP. As illustrated in FIG. 2, an AP may send a polling message after waiting for PIFS. If a client has nothing to transmit, the client may return a null data frame. Because PIFS is smaller than DIFS, it may lock out all the asynchronous traffic. PCF may be deterministic and fair, and may be efficient for both low duty-cycle and heavy or bursty traffic.

The Institute of Electrical and Electronics Engineers (IEEE) 802.11 High Efficiency WLAN (HEW) Study Group (SG) has explored enhancing the Quality of Experience (QoE) for a broad spectrum of wireless users in many usage scenarios including high-density scenarios in the 2.4 GHz and 5 GHz band. Use cases that support dense deployments of APs, and STAs, and associated Radio Resource Management (RRM) technologies are being considered by the HEW SG.

Applications for HEW may include emerging usage scenarios including but not limited to data delivery for stadium events, high user density scenarios such as train stations, or enterprise/retail environments, evidence for an increased dependence on video delivery, and wireless services for medical applications.

The IEEE 802.11ax Task Group (TG), based on a Project Authorization Request (PAR) and Criteria for Standards Development (CSD) has been established, for example, based on work in the HEW Study Group (SG).

IEEE 802.11ah may provide basic service set (BSS) color and/or partial association identification (Partial-AID). The BSS color may be a mechanism in 802.11ah to enable STAs to distinguish, for example, between downlink transmissions from either their own or other BSSs. FIG. 3 illustrates S1G capabilities information field. As illustrated in FIG. 3, the BSS color may be transmitted in the Sub 1 GHz (S1G) capabilities information field to enable STAs to identify the color of the AP with which they may be negotiating.

FIG. 4 illustrates an example of a SIG-1 frame structure. BSS color may be transmitted in the ID field of SIG-1 field of a packet (e.g., every packet) that may be transmitted as part of the preamble. This may allow STAs to roughly identify the transmitting BSS by decoding the preamble. BSS color may not be unique. A STA may use BSS color to determine that the signal does not belong to the BSS with which it is associated. The STAs may not be certain that the transmitted signal belongs to its own BSS.

The BSS color may be placed in TXVECTOR/RXVECTOR parameter. The BSS color may be used to assist a receiving STA in identifying the BSS from which a reception may originate. The receiving STA may reduce power consumption by terminating the reception process, for example, when the reception may not be from the BSS with which the STA may be associated.

Partial AID may be a mechanism used to identify the recipient of a transmission frame from a STA. The partial AID may provide an abbreviated indication of the intended recipient(s) of a PLCP Service Data Unit (PSDU). The partial AID may be carried in the receive address (RA), for example, when the frame is addressed to a STA or the Partial BSS ID, for example, when the packet is addressed to the AP.

A combination of the BSS color and Partial AID may assist in member physical protocol data unit (PPDU) identification and may be used for one or more of the following in 802.11ah: for power savings; to detect Spatially Orthogonal transmission during OBSS/non-OBSS transmissions; in CCA operation; or in Response Indication Deferral.

BSS color and/or PAID may be used in IEEE 802.11ah. For example, the BSS color may be used in IEEE 802.11ah to achieve power savings as described herein. The TXVECTOR parameter COLOR may be used to assist a receiving STA in identifying the BSS from which a reception originates. The receiving STA may reduce power consumption by terminating the reception process, for example, when the reception is not be from the BSS with which the STA is associated.

Spatially Orthogonal Transmission (e.g., using sectorization) and BSS Color may be described herein. The RXVECTOR parameter COLOR may be utilized to detect a spatially orthogonal (SO) condition, for example, by classifying the received PPDU between a BSS transmission (e.g., same BSS transmission) and an OBSS transmission. If the early sector indicator is equal to 0, OBSS STA may not check for spatially orthogonal conditions If the Early Sector Indicator is 1, the Early Sector Indicator field may indicate that the NDP CTS frame may be followed by the sectorized beam frame exchange. If the Early Sector Indicator is 0, it may indicate that the NDP CTS frame may not be followed by the sectorized beam frame exchange.

CCA operation using BSS Color/PAID may be provided. For example, if a STA identifies that a transmission is associated with the same BSS as the STA is associated with, the STA may set the channel to busy status. If a STA identifies that a transmission is associated with an OBSS, the STA may set the channel to busy, for example, if the CCA exceeds a minimum CCA sensitivity level.

Response indication deferral using member PPDU identification may be provided. For example, in IEEE 802.11ah, virtual carrier sensing mechanism may be added to the CSMA/CA algorithm called the response indication deferral (RID), for example, when the NAV counter or the RID counter is non-zero and the indication may be that the medium is busy. The counter may be modified, for example, based on if the transmission is from within the BSS or from an OBSS.

BSS color in IEEE 802.11ax may be provided. Clear channel assessment threshold and transmit power control (CCA/TPC) may be adjusted, e.g., based on BSS color. BSS color implementations may use modification of the CCA of the STA receiving the signal. Adjusting CCA (e.g., only CCA) may not increase the system spectral efficiency. Joint CCA threshold and TPC adjustment may be utilized, e.g., to increase the usage of limited frequency time resources. Incorporating TPC may result in change in implementations and/or signaling when transmit power control is used and/or when information on the receiver sensitivity of the desired receiver is known.

Advanced spatial reuse using BSS Color may be provided. System spectral efficiency may be improved by using BSS color. BSS color may allow spatial reuse between adjacent or overlapping BSSs (OBSSs). Joint CCA and TPC adjustment may enable the use of spatial reuse. CCA and TPC may not fully protect the spatial reuse transmissions and/or avoid collisions between OBSS transmissions. Signaling between the transmitter and receiver using BSS color information may be used to fulfil this purpose and/or enable a revised receiver design.

Transmit scheme specific color may be provided. BSS color scheme, e.g., in IEEE 802.11ah, may include transmissions on the sub 1 GHz frequency band. IEEE 802.11ah may provide support for enlarged coverage range, enhanced power saving, and/or large number of devices. Next generation of WLAN systems may have one or more features, such as dense deployment, high spectral efficiency, and/or the format of existing BSS color may not fit the new requirements. One or more transmit schemes, such as OFDM, OFDMA, MU-MIMO, etc. may be supported. A transmit scheme specific BSS color format or system may be utilized to better serve these targets.

BSS Color Modification and Coordination may be provided. The value associated with a BSS color may be selected, for example, when a BSS is established. In order to provide efficient interference handling, the color of the BSS may be selected in coordination with surrounding overlapping BSSs. A BSS may select a different BSS color due to interference from an OBSS. An AP may announce the change of BSS color to one or more STAs associated with the AP. BSS color modification and/or coordination may be utilized to provide optimized interference handling.

The transmit address and the receive address of the nodes in the examples described herein may be placed in the packet, e.g., in the MAC header or in the PHY SIG, to enable identification of OBSS transmissions.

Figure 5:
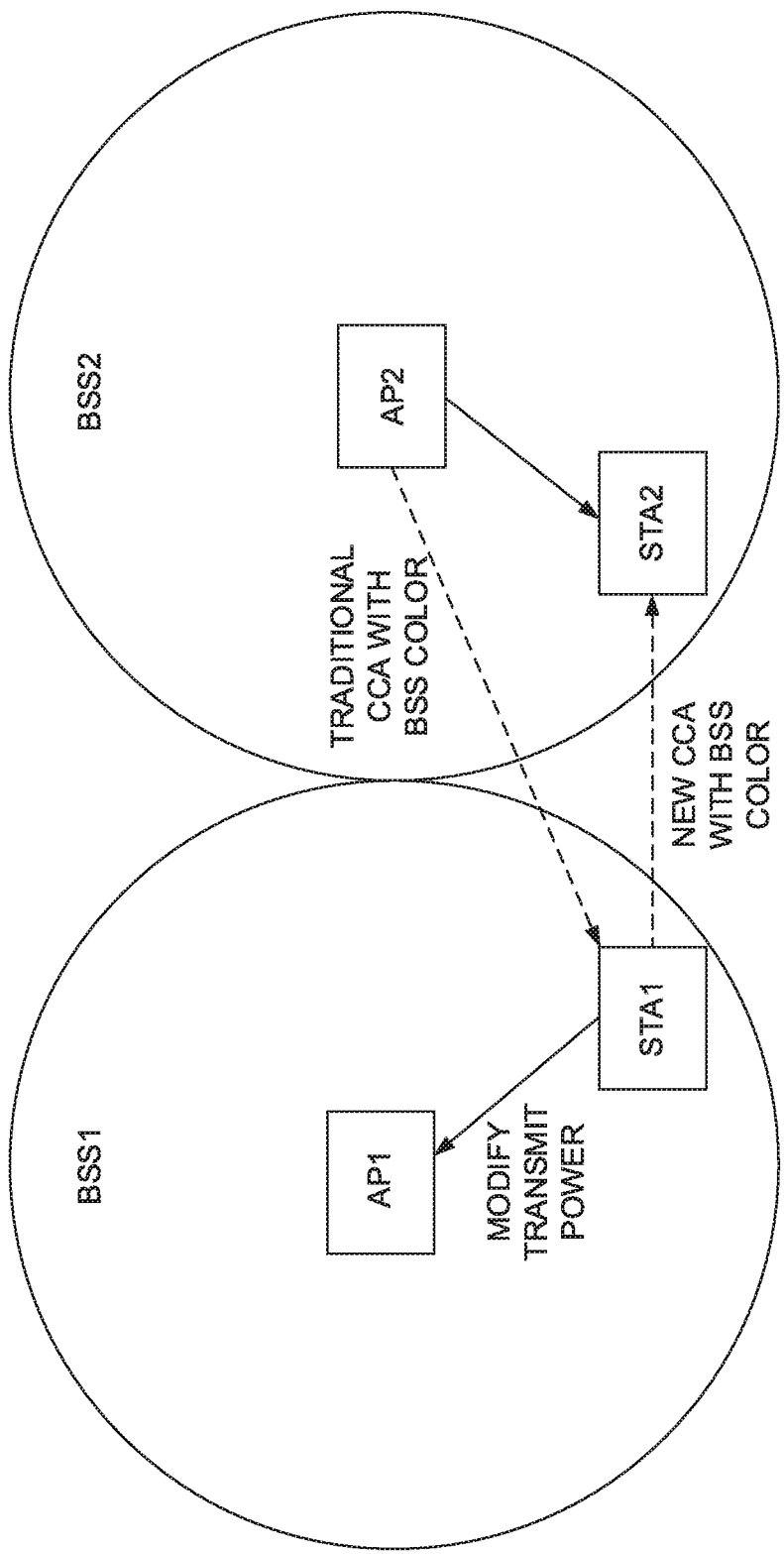
FIG. 5 illustrates an example of Clear Channel Assessment (CCA) threshold with basic service set (BSS) color.

Clear Channel Assessment Threshold and Transmit Power Control (CCA/TPC) based on BSS Color may be provided. FIG. 5 illustrates an example of Clear Channel Assessment (CCA) threshold with basic service set (BSS) color. As illustrated in FIG. 5, the CCA threshold criterion and/or the transmit power of STA1 in BSS1 may be modified, for example, based on a determination (e.g., an early determination) of the source BSS on the overheard transmission or the effect of a transmission by the overhearing STA1 on the recipient of the overheard transmission STA2 in BSS2.

The early determination of the source BSS on the overheard transmission may be identified in a downlink transmission using the BSS color parameter located in the preamble. If the BSS color of the transmission is not equal to that of the STA, the transmission may not be from its own BSS (e.g., the transmission may be an OBSS transmission). If the BSS color of the transmission is equal to that of the STA, the transmission may be from its own BSS.

The early determination of the source BSS on the overheard transmission may be identified in uplink transmission, for example, using the receive address (RA) of the overheard packet. If the RA is not equal to the address of its AP, the transmission may not be from its own BSS. If the RA is equal to the address of its AP, the transmission may be from its own BSS. The receive address may be a compressed version of the RA, such as a Partial AID. As illustrated in FIG. 5, a transmission from STA2 or AP2 may be identified by STA1 as an OBSS transmission, for example, if the color of BSS1 (e.g., operated by AP1) and BSS2 (e.g., operated by AP2)) are different.

As further illustrated in FIG. 5, the CCA threshold criterion and/or the transmit power of STA1 in BSS1 may be modified, for example, based on the effect of a transmission by the overhearing STA, e.g., STA1 on the recipient, e.g., STA2 of the overheard transmission. The overhearing STA, e.g., STA1 may identify the receiver characteristics of the recipient, e.g., STA2 of the overheard transmission.

For example, as illustrated in FIG. 5, STA1 may identify the receiver characteristics (e.g., Rx sensitivity or Rx power needed) associated with the recipient OBSS STA, e.g., STA2, and/or modify its own CCA threshold in an STA specific manner. Knowledge of the receiver requirements for its own receiver and/or the recipient of the OBSS transmission may enable it to set its CCA threshold (e.g., and transmit power) to a level that may be beneficial to both STAs. A discovery mechanism may be utilized to identify the receiver requirements and/or characteristics for the recipient OBSS STA, STA2. A discovery mechanism may be utilized to identify the receiver requirements and/or characteristics for one or more (e.g., all) OBSS STAs. The identified receiver requirements and/or characteristics may be stored, e.g., for use at an appropriate time.

For example, STA1 may identify one or more STAs that may have receiver requirements under a threshold or within a range of thresholds. STA1 may modify its CCA associated with the receivers in the group in a common manner.

The receiver requirements may be collected explicitly or implicitly. For example, a network may comprise an AP, an STA (e.g., STA2)) in an OBSS, and an STA (e.g., STA1) in the BSS managed by the AP. A STA (e.g., STA2)) may broadcast (e.g., periodically broadcast) a packet that comprises its transmit power and/or its minimum received power and/or headroom for a desired operating point (e.g., MCS and SNR). The desired operating point may be derived and/or determined from the received ACK/NAK statistics of the STA, for example, by the AP or the sender. The desired operating point may be pre-specified. STAs that receive this packet (e.g., STA1) may estimate (e.g., implicitly estimate) the effect of their transmission on the OBSS STA's (e.g., STA2)) receiver.

For example, a frame exchange may take place between two STAs (e.g., STA1 and STA2)) with a request (e.g., an explicit request) from STA1 to STA2 for its received power requirements. STA2 may send a frame indicating its transmit power and/or minimum received power for a desired operating point (e.g., MCS or SNR). Other STAs may overhear this transmission and may utilize the information as described herein. Inter-BSS requests may be allowed. For example, an STA1 may estimate (e.g., implicitly estimate) the receiver power requirements of STA2 by measuring the power received when STA2 is transmitting. STA1 may explicitly or implicitly know the transmit power and desired operating point of STA2.

CCA based on transmitter and/or receiver characteristics (e.g., BSS Color and/or Rx sensitivity) may be provided. CCA threshold criterion used by an STA (e.g., STA1) may be modified based on the following: whether the transmission overheard by the STA is in its own BSS or from an OBSS, e.g., using the BSS color/RA; and/or the Rx sensitivity of the recipient of the OBSS transmission. Based on this information, an exemplary CCA threshold may be estimated as described herein. CCA threshold estimation as described variously herein may include setting and/or use of the estimated CCA threshold. An STA (e.g., STA1) may overhear a packet transmission and/or decode the SIG field. If the transmission is from a node in the STA's own BSS, the transmission may be protected (e.g., always protected) leading to:

CCA=−inf (e.g., or the minimum value of an allowed range).

If the transmission is from a node in an OBSS, the transmission may be protected based on estimating a new CCA threshold. If the energy in the channel exceeds the new CCA threshold, the transmission may be protected. If the energy in the channel is less than the new CCA threshold, the STA may be free to transmit. The CCA threshold may be estimated as:

CCA (dBm)=CCA_nominal (dBm)+Margin (dB)

Margin=f(AP_STA1, STA2_STA1)

The function with which the margin is determined may comprise information from the STAs, such as one or more of their receiver sensitivity, transmit power level, transmit headroom, or capabilities, etc. One or more of CCA_nominal, margin, AP_STA1, or STA2_STA1 may be assumed. The CCA_nominal may refer to a baseline CCA for the network and/or the BSS specific CCA used in the network. The margin may refer to the STA specific modification of the nominal CCA. The margin may be a function of the transmission in a STA's own BSS, e.g., BSS1, between the STA in its own BSS, e.g. STA1, and the AP in the STA's own BSS, e.g., AP1, and/or the receiver requirements of the OBSS STA, e.g., STA2, receiving (e.g., currently receiving) a packet from its AP in the OBSS, e.g., BSS2 from the point of view of the STA1. If the margin is zero for some or all STAs, the CCA adjustment may become BSS-wide. The AP_STA1, used in calculating the Margin, may refer to the receiver requirements of the AP, for example, based on transmission from STA1 to AP1 in BSS1. For example, this may be a function of the channel gain between AP1 and STA1 estimated by the SINR of a transmission at the AP or the power received at the AP due to transmission by STA1 (e.g., or vice versa). STAs that have a higher channel gain or higher SINR/received power may transmit faster and/or with less interference to out-of-BSS transmissions and may have a higher CCA and/or vice versa.

The STA2_STA1, used in calculating the Margin, may refer to the receiver requirements of STA2, for example, based on transmission from STA1 to AP1. For example, this may be a function of the channel gain between STA2 and STA1 estimated by the power received at the STA2 due to transmission by STA1 (e.g., or vice versa). STAs that have a higher channel gain or higher SINR/received power may transmit faster and with less interference to out-of-BSS transmissions and may have a higher CCA and/or vice versa.

For example, $$\text{margin} = \max\left(\min\left(\left(\frac{gain_{AP1,STA1} - gain_{min}}{gain_{max} - gain_{min}}\right), 0\right) \cdot CCA_{bias}, \min\left(\left(\frac{gain_{STA2,STA1} - gain_{min}}{gain_{max} - gain_{min}}\right), 0\right) \cdot CCA_{bias}\right)$$

where the CCA_bias may equal the range over which the CCA may be modified in the network; the Gain_min may be the channel gain associated with a desired worst channel; and the Gain_max may be the channel gain associated with a desired best channel.

To estimate the channel gain, one or more of the following mechanisms may be utilized. To estimate the channel gain, an AP may send out a broadcast frame with information about its transmit power in the frame. One or more (e.g., each) STA may estimate the channel gain from the AP using the transmit power information and/or the power received. The AP may poll one or more (e.g., each) STA and one or more (e.g., each) STA may feedback the channel gain estimated. One or more (e.g., each) STA may send back (e.g., piggy-back) information about the channel gain on any frame it sends to the AP. The AP may poll STAs that may have not sent back information within a specific duration.

To estimate channel gain, an AP may send out a frame requesting STAs to include their transmit power in a packet (e.g., any packet) the STAs may send. The AP may poll one or more STAs (e.g., each STA) to send a Null Data Packet (NDP) with the transmit power information piggybacked on the frame. The AP may use this information to estimate the gain of the channel to the specific STA (e.g., assuming channel reciprocity).

CCA threshold estimation may be provided. For example, the CCA criterion may be selected based on one or more of the following. An STA1 may overhear a packet transmission and/or decode the SIG. If the STA1 determines that the received packet transmission belongs to its own BSS transmission, the transmission may be protected (e.g., may always be protected). CCA may equal-inf (e.g., or the minimum value of an allowed range). If the STA1 determines that the received packet transmission does not belong to its own BSS transmission, the transmission may be protected, for example, based on estimating a new CCA threshold. If the energy in the channel exceeds the CCA threshold, the transmission may be protected. If the energy in the channel is less than the CCA threshold, the STA may be free to transmit. In this case, the CCA threshold estimated may depend on if an OBSS transmission is detected or not. In this case, the CCA threshold in the OBSS scenario may be different from the CCA threshold in a non-OBSS scenario. The CCA threshold may be estimated as CCA (dBm)=CCA_nominal (dBm)−Margin (dB)

If a received transmission is an OBSS transmission, the margin may be set to $$\text{Margin} = \min\left(\left(\frac{gain_{STA2,STA1} - gain_{min}}{gain_{max} - gain_{min}}\right), 0\right) \cdot CCA_{bias}$$

If no transmission is received and/or if a transmission is received from an unidentified BSS, the margin may be set to $$\text{Margin} = \min\left(\left(\frac{gain_{AP1,STA1} - gain_{min}}{gains_{max} - gain_{min}}\right), 0\right)$$

The CCA thresholds may be grouped, for example, based on the channel gain, rather than making the CCA STA-specific. For example, STAs within a certain range of gain may have their margin set to identical values. This may be the margin associated with a specific gain value within the range, for example, the maximum gain, the minimum gain or the average gain (e.g., mean or median gain), such as with identical margins. Where STAs are grouped together based on criterion, such as in MU-MIMO, the CCA may be associated with a Group ID wherein the STA that belongs to a particular group may be assigned a CCA threshold for that Group ID.

TPC Based on BSS Color may be provided. The CCA threshold criterion and the transmit power used by an STA (e.g., STA1) may be modified, for example, based on the following: whether the transmission overheard by the STA is in its own BSS or from an OBSS, e.g., using the BSS color; and/or the Rx sensitivity of the recipient of the OBSS transmission.

The CCA criterion and transmit power may be set as described herein. A STA (e.g., STA1) may overhear a packet transmission and/or decode the SIG field. If the transmission is from a node in the STA's own BSS, the transmission may be protected (e.g., may always be protected). In such a case, there may be no transmission. The CCA may equal-inf (e.g., or the minimum value of an allowed range). The transmit power for the STA transmitting may be set as a function of the gain between the STA and the AP.

Tx_power=nominal_Tx_power−(Rx_power AP1−Rx_power_desired API)

If the transmission is from a node in an OBSS, the CCA threshold criterion and transmit power may be estimated as:

CCA=CCA nominal+Margin

Tx_power=Tx_power nominal−Margin

Margin=f(AP_STA1, STA2_STA1)

In this case, the STA transmit power may be a function of its recipient and the recipient of the OBSS transmission. The AP_STA1 may refer to the receiver requirements of the AP, for example, based on transmission from STA1 to AP1. For example, this may be a function of the channel gain between AP1 and STA1 estimated by the signal to interference and noise ratio of a transmission at the AP1 or the power received at the AP1 due to transmission by STA1 (e.g., or vice versa). The STAs that have a higher channel gain or higher SINR/received power may transmit faster and with less interference to out-of-BSS transmissions and may have a higher CCA and/or vice versa. The STA2_STA1 may refer to the receiver requirements of STA2, for example, based on transmission from STA1 to AP1. For example, this may be a function of the channel gain between STA2 and STA1 estimated by the power received at the STA2 due to transmission by STA1 (e.g., or vice versa). The STAs that have a higher channel gain or higher SINR/received power may transmit faster and with less interference to out-of-BSS transmissions and may have a higher CCA and/or vice versa. For example, $$\text{margin} = \max\left(\min\left(\left(\frac{gain_{AP1,STA1} - gain_{min}}{gain_{max} - gain_{min}}\right), 0\right) \cdot CCA_{bias},\right.$$
$$\left.\min\left(\left(\frac{gain_{STA2,STA1} - gain_{min}}{gain_{max} - gain_{min}}\right), 0\right) \cdot CCA_{bias}\right)$$

where CCA_bias may equal the range over which the CCA is modified in the network; Gain_min may equal the channel gain associated with a desired worst channel; and Gain_max may equal the channel gain associated with a desired best channel. For example, $$\text{Margin} = \min\left(\left(\frac{gain_{STA2,STA1} - gain_{min}}{gain_{max} - gain_{min}}\right), 0\right) \cdot CCA_{bias}$$

The channel gain may be associated with a GroupID, for example, wherein the STAs which belong to a particular group may be assigned a particular channel gain.

Figure 6:
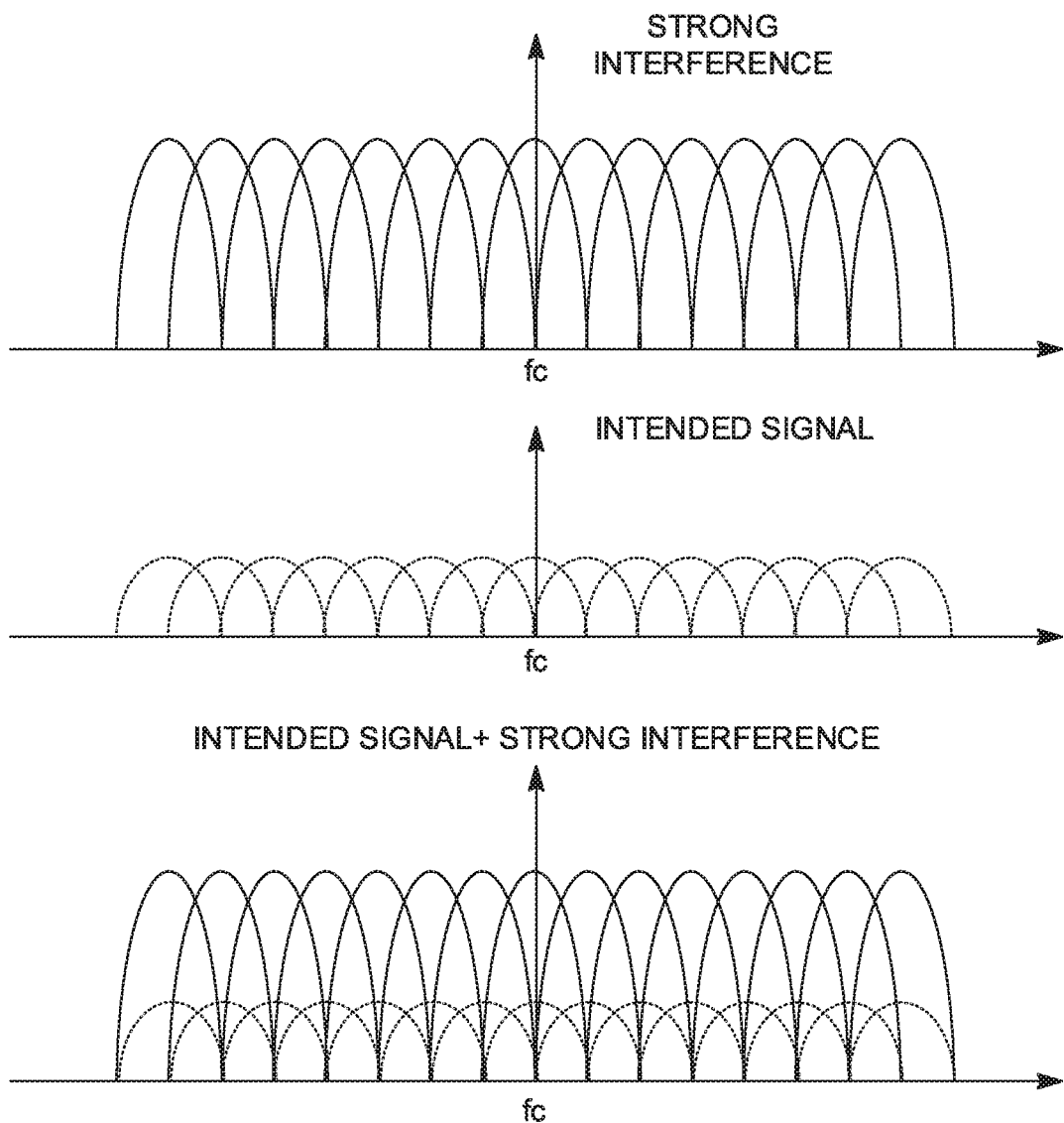
FIG. 6 illustrates an example overlapping orthogonal frequency divisional multiplexing (OFDM) transmission of an intended signal in the presence of strong interference.

Advanced Spatial Reuse using BSS color may be provided. FIG. 6 illustrates an example of an overlapping OFDM transmission of an intended signal in the presence of a strong interference. As illustrated in FIG. 6, a STA (e.g., a receiving STA) may encounter strong interference in the same or overlapping frequency band, for example, due to concurrent OFDM transmission. For example, such a scenario may occur when one or more BSSs are densely deployed. For example, due to lack of coordination between one or more WiFi APs and/or one or more STAs, adjacent APs or STAs in an OBSS may transmit their signal using the overlapping carrier frequency and subcarrier structure to what may be used by the AP in their own BSS. In a densely deployed WLAN system, interference induced by APs and/or STAs in an OBSS may be prohibitive. Direct interference suppression mechanisms, such as spatial domain suppression or frequency domain suppression, may work poorly in such dense deployment scenarios, for example, due to the low signal to interference ratio at the STA.

Systems, methods, and instrumentalities may be provided for signaling between transmitter and receiver to enable multiple OBSS transmissions. A STA at the edge of a coverage area may check BSS color information in the preamble of the received signal of interest, for example, if the STA has sensed an unknown interference signal in the same frequency band as that used for CCA. The STA may determine the channel characteristics of the interference channel, for example, if the BSS color indicates that the signal is from an OBSS. The mechanisms used by the STA may utilize sounding the interference channel, leveraging channel estimation of the interference channel using a known signal component of the interference channel (e.g., the preamble of the transmitted frames), and/or using a side channel, such as a primary channel, to determine the potential resource loading of adjacent channels.

STAs and/or APs may perform intelligent resource allocation and/or interference suppression, for example, when interference is identified. Such resource allocation and/or interference suppression may be performed, for example, to limit the effect of the interference and/or to enable the STAs in the overlapping BSSs to transmit/receive data, e.g., transmit/receive data with minimal interference.

A channel may have resources in time, frequency, space and/or beam. A channel resource allocation may use one or more of these resources to improve the interaction between nodes that may be simultaneously transmitting in overlapping BSSs. An alternate resource may be used, for example, in the event interference is suspected in a resource. A channel may support multiple sub-channels that may be orthogonal in frequency. A channel may support different time slots to enable multiple resource opportunities. If interference is suspected in one sub-channel (e.g., based on information gleaned from the BSS color of the preamble), other sub-channels may be selected for transmission.

A channel may support a downward tilted and/or an upward tilted beam, which when used in combination may be equivalent to a vertically omni-directional beam. If interference is suspected, the energy in the upward tilting and downward tilting beams may be compared to determine the severity of the interference, and identify a channel resource that may be more advantageous for communications. This mechanism may be extended to two or more beams for channel resources. A channel beam (e.g., a downward tilting beam) may not experience interference from an OBSS, while the other beams (e.g., upward tilting beams) may experience such OBSS interference.

A channel may support transmit or receive beamforming to enable suppression of interference, for example, if the interference is suspected. Signaling may be provided to assist in the resource allocation. Signaling associated with beamforming may be provided.

Figure 7:
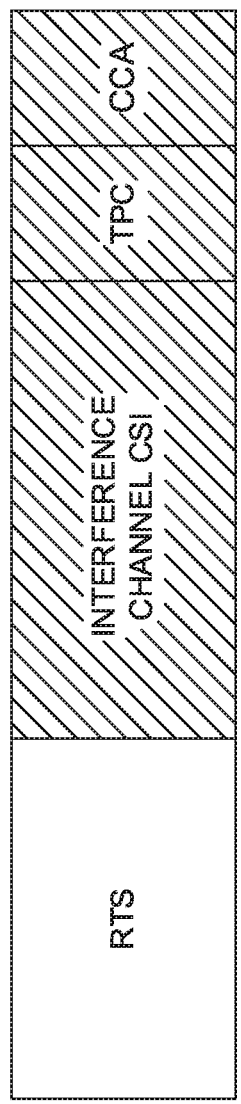
FIG. 7 illustrates an example medium access control (MAC) frame format of a feedback packet.

Signaling and beamforming at an AP in STA's own BSS may be provided. FIG. 7 illustrates a MAC frame format of a feedback packet from a STA to an AP in STA's own BSS. A STA that supports beamforming in the STA's own BSS may feedback the channel state information (CSI) of the interference channels to the AP in STA's own BSS. The AP may use the beamforming to avoid the reception interference at the STA. The TPC, CCA, and/or interfered channel ID may be sent to the AP in STA's own BSS. The messages sent by the STA to its AP in STA's own BSS may be utilized by the AP to minimize the impact on the concurrent transmission in the OBSS. These messages may be utilized for interference cancellation, e.g., when spatially orthogonal transmission is employed.

A STA in its own BSS may cause severe interference to the ongoing transmission at adjacent devices in the OBSS, for example, if concurrent feedback is made through the same frequency band used in the OBSS. Frequency, temporal, and/or spatial separations of the feedback signal may be adopted. This may be done to minimize the impact on the communication in the OBSS.

Figure 8:
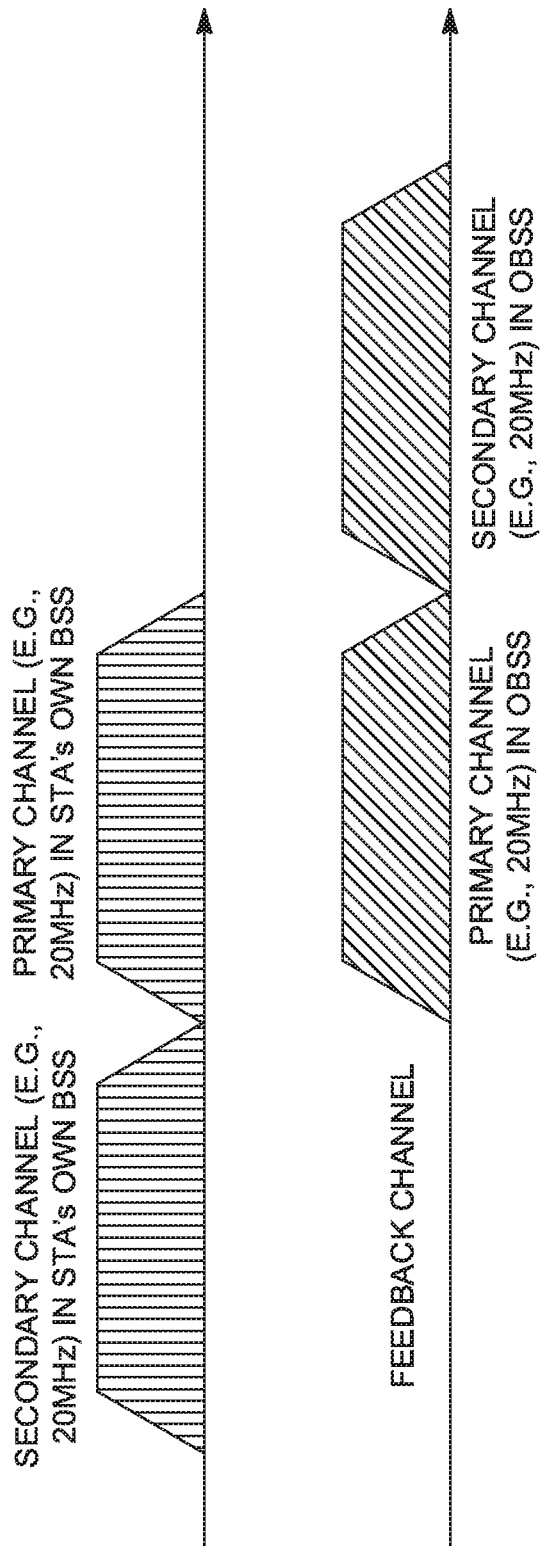
FIG. 8 illustrates example feedback information to a STA's own access point (AP) using a non-overlapping secondary channel.

Signaling using a non-overlapping frequency sub-band may be provided. FIG. 8 illustrates feedback information to an AP in a STA's own BSS using a non-overlapping secondary channel. As illustrated in FIG. 8, partial overlapping of the frequency bands between a STA's own BSS and an OBSS may be utilized. As illustrated in FIG. 8, for example, in case of transmissions with 40 MHz bandwidth, a STA in its own BSS may choose to use the primary 20 MHz channel occupied by the OBSS to realize and/or enable spatial reuse. The STA in its own BSS may choose the secondary 20 MHz channel different from the one used in the OBSS. The non-overlapping channel may serve as a feedback channel to send the AP in the STA's own BSS the information utilized for simultaneous transmission in the overlapping primary channel. The information acquisition and feedback may be provided as described herein. A CCA performed at a STA may indicate that the 20 MHz primary channel may be occupied.

A STA may choose to decode the SIG field, for example, to check the BSS color. The BSS color may indicate that the transmission may be in an adjacent OBSS. The STA may continue the CCA in other channels and may determine an idle channel. The STA may determine to use the 20 MHz primary channel and the idle 20 MHz channel. The idle 20 MHz channel may be different from the secondary channel used in the OBSS for simultaneous transmission. The STA may estimate the interference channel, for example, based on a received interference signal. The STA may send the channel IDs of the primary and secondary channels, the CCA, TPC, interference channel CSI, and/or other information to the AP in the STA's own BSS. The STA may send the information through a non-overlapping secondary channel. The AP in the STA's own BSS may use the feedback information to select appropriate transmit power. The transmit power may be which may not lead to interference (e.g., significant interference) at the adjacent OBSS. The simultaneous transmission may proceed on the interfered primary channel and the non-interfered secondary channel.

Signaling using spatial orthogonal transmission may be provided. Spatial orthogonal transmission may be used by a STA to feedback information to its own AP. For example, STAs with strong spatial domain processing ability may use such spatial orthogonal transmission. The STA in its own BSS may have multiple antennas. The multiple antennas may be used to create spatial nulls. The spatial dimensions occupied by the interference signal from the OBSS may not be too large. In case of large interference signal, the STA in its own BSS may be incapable of handling the spatial orthogonal transmission.

There may be multiple application examples for signaling using the spatial orthogonal transmission. For example, one or more (e.g., all) legacy devices in an adjacent OBSS may transmit (e.g., always transmit) in the single-input single-output (SISO) mode. A STA in its own BSS (e.g., the primary BSS) may have a sufficient number of antennas that may be more than the number of ongoing transmission streams in the OBSS. In an example, there may be two transmission in an OBSS and only one OBSS may be active. In this case, the STA in its own BSS may have three or more antennas to enable it cancel the two streams of interference from the OBSS. In an example, the devices in the adjacent OBSS may use MIMO transmission. Since there may be several STAs in the OBSS that may transmit simultaneously to their associated AP, the overall spatial dimensions of the interference signal may be large. The STA in its own BSS may not have the number of antennas that may be needed for spatial nulling (e.g., only spatial nulling). When the adjacent AP transmits, the associated STAs in the OBSS may be assumed to be muted. The STA in its own BSS may choose to feedback (e.g., only to feedback) information during the transmission of the adjacent AP. In such a case, the STA may need to have greater number of antennas than that at the adjacent AP.

Figure 9:
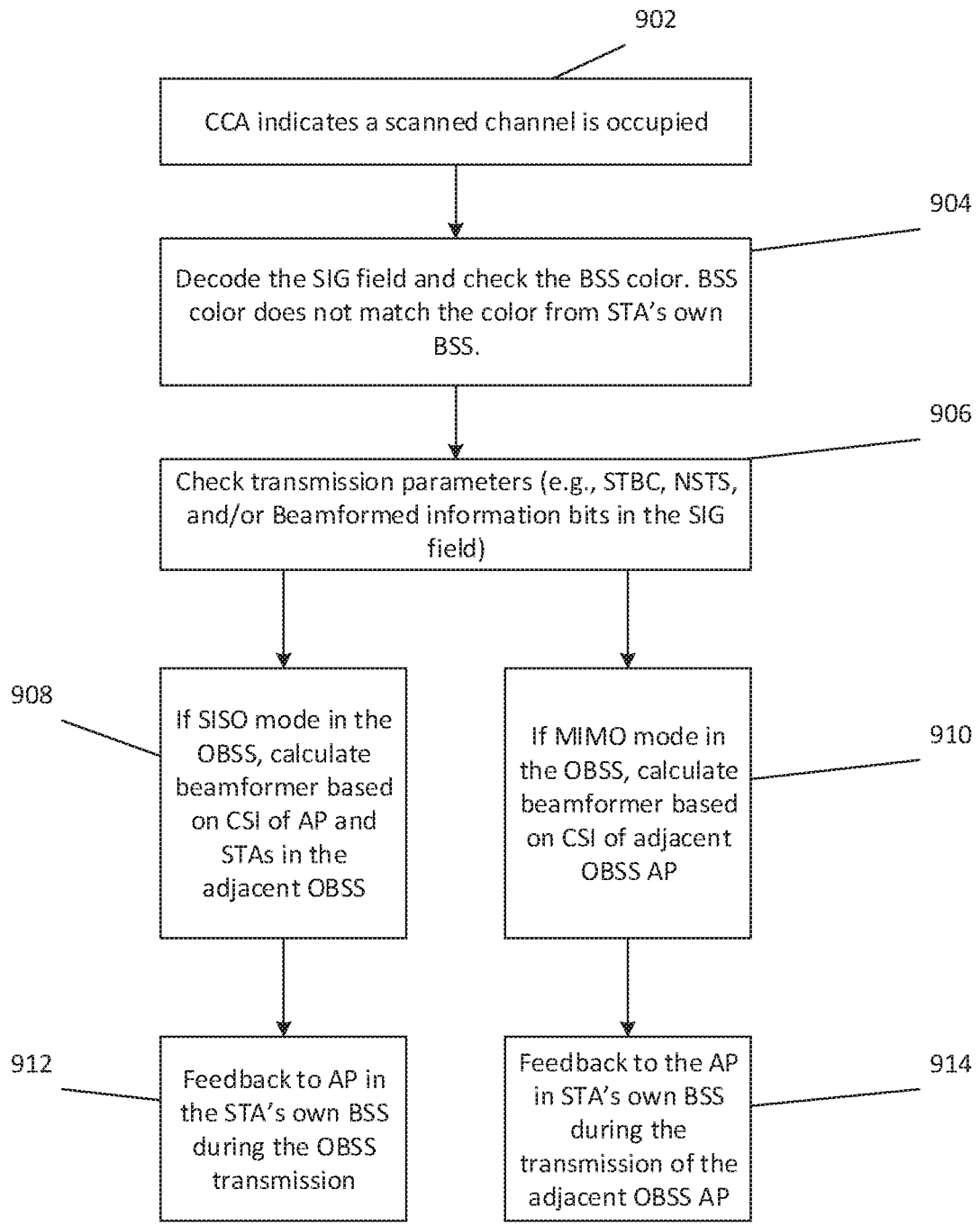
FIG. 9 illustrates an example spatial orthogonal feedback.

FIG. 9 illustrates spatial orthogonal feedback. As illustrated in FIG. 9, at 902, CCA process at the STA in its own BSS may indicate that a scanned channel is occupied. At 904, the STA may decode the SIG field to check the BSS color. The BSS color may indicate that the transmission may be from an adjacent OBSS. The STA may estimate the channel state information (CSI) of the interference channel, for example, using a long training field (LTF) in the received interference signal. At 906, the STA may determine transmission parameter(s) such as space-time block coding (STBC), number of space-time streams (NSTS), and/or beamformed information from the SIG field. This information may be used to determine whether a device in the OBSS uses MIMO or not. For example, if NSTS>1 and STBC=1, MIMO configuration may be indicated. In another example, if NSTS=1 and STBC=0, the beamformed bit may be checked. If beamformed bit is 1, MIMO may be used. Other combinations of STBC, NSTS, and beamformed bits may indicate SISO mode. At 910, if MIMO mode is employed in the adjacent OBSS, the STA in its own BSS may check the group ID in the SIG field to identify if the transmission originated from an adjacent OBSS AP. The STA may calculate the beamforming vector in the null space of the signal space occupied by the transmission of the adjacent OBSS AP. At 914, the STA in its own BSS may utilize the calculated beamforming vector to send feedback information to the AP in the STA's own BSS. The STA in its own BSS may send the feedback information simultaneously when the adjacent OBSS AP transmits. At 908, if SISO is employed in the adjacent OBSS, the STA in its own BSS may calculate the beamforming vector in the null space of some or all the interference signals from the AP and/or the STAs in adjacent OBSS. At 912, the STA in its own BSS may use the beamforming vector to send feedback information to AP in its STA's own BSS. The STA in its own BSS may send the feedback information simultaneously while the AP and/or STAs in the adjacent OBSS are communicating.

Figure 10:
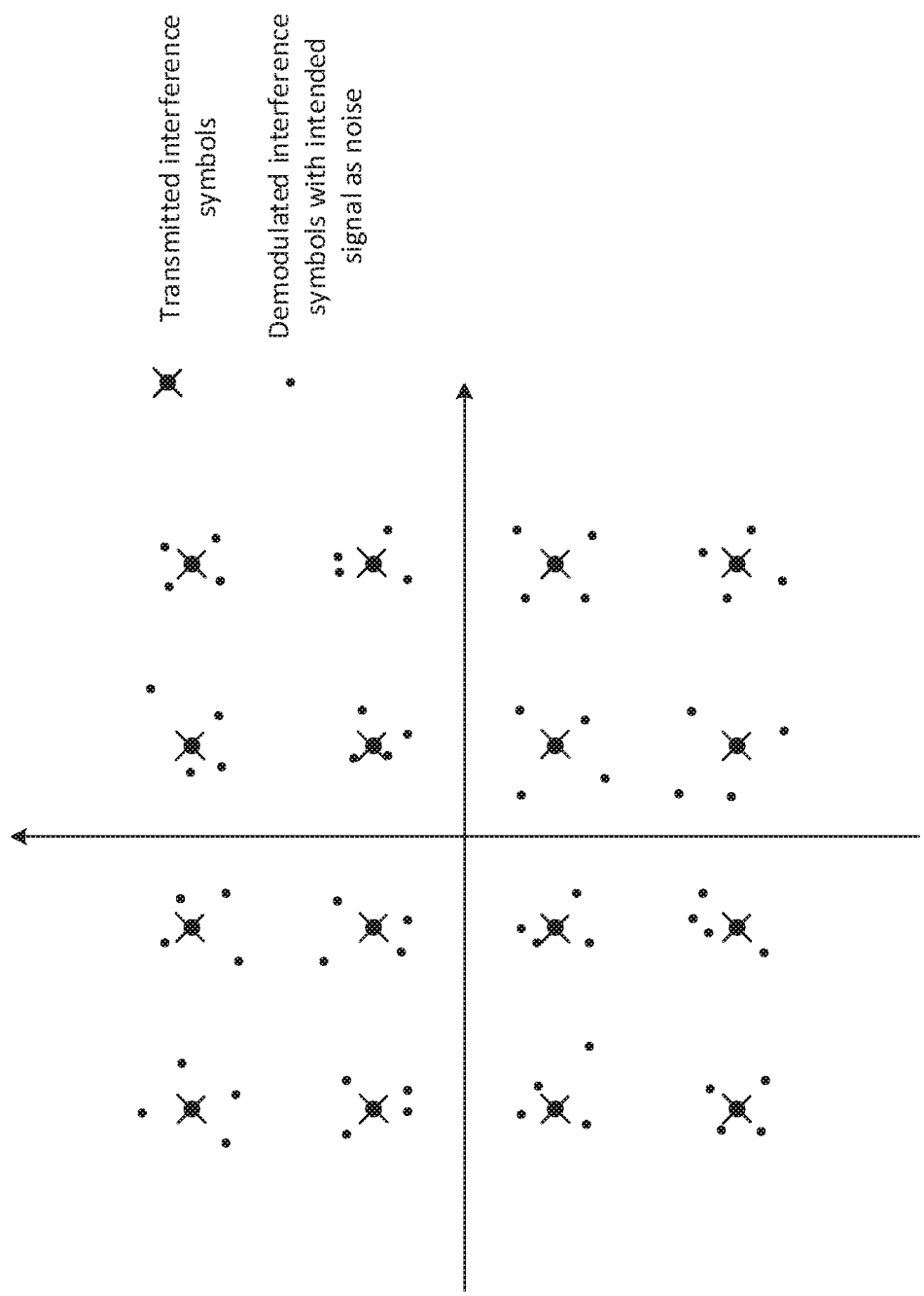
FIG. 10 illustrates an example demodulated interference symbols mixed with intended symbols.

Receiver examples for reception of simultaneous transmissions with strong OBSS interference are described herein. FIG. 10 illustrates demodulated interference symbols mixed with intended symbols as noise. A STA during reception may attempt to demodulate an interference signal in error, for example, due to the signal of interest being suppressed by the interference. As illustrated in FIG. 10, the interference signal may have a high received power at the STA and may use a high QAM modulation (e.g., 16 QAM). The intended signal sent by the AP in the STA's own BSS may be relatively low in receive power and may use a QPSK modulation.

After removal of the cyclic prefix (CP) and transformation of the signal to the frequency domain using an FFT, the received signal on the k-th subcarrier may be represented by, $$Y_k = H_{1,k} X_{1,k} + H_{2,k} X_{2,k} + N_k,$$

where $H_{1,k}$ may be the desired channel response between the STA and an associated AP; $X_{1,k}$ may be the intended symbol on the k-th subcarrier; $H_{2,k}$ may be the interference channel response; and $X_{2,k}$ may be the interference symbol on the k-th subcarrier.

The received signal $Y_k$ may be equalized using $\hat{H}_{2,k}$, the estimated interference channel on the k-th subcarrier. The demodulated interference symbol $\hat{X}_{2,k}$ may be yielded with intended signal as part of the effective noise. As illustrated in FIG. 10, the interference symbol constellation is represented by the smaller dots. The larger dots with a cross through them indicate the transmitted constellation of the interference symbols. The symbol error rate (SER) of the demodulated interference symbols may be high, for example, due to the noise from the intended signal.

The interference signal may be encoded by a powerful error correction code, such as LDPC or Binary convolutional code (BCC). The STA may demap the interference symbols and may decode the bit sequence. With the aid of LDPC or BCC, the coded bit error rate of the interference signal may be low (e.g., fairly low). The STA may use the modulation and coding scheme (MCS) information obtained from the interference packet preamble to implement the encoding and/or modulation for the corrected bit sequence of the interferer. The STA may retrieve an interference symbol estimation, $\check{X}_{2,k}$, with a lower (e.g., much lower) SER.

The STA may subtract the estimated strong interference, $\hat{H}_{2,k}\check{X}_{2,k}$, from the received signal $Y_k$. The STA may use the CSI between itself and the AP in the STA's own BSS gained in the non-interfering transmission stage. The STA may demodulate and/or decode the intended signal without the strong interference.

Interference suppression receivers, such as an interference rejection receiver, may be used to eliminate the OBSS interference, for example, rather than using an interference cancellation receiver. OBSS transmission may start, for example, before the transmission in a STA's own BSS, which may enable the STA to estimate the channel and/or to decode the SIG field and identify the color. A packet for transmission in a STA's own BSS may end after the transmission for the OBSS transmission. In this case, transmission of the ACK from STA1 to the AP in the STA's own BSS may occur as normal. In an example, the packet for the STA's transmission in its BSS may end, for example, before the transmission from the OBSS transmission. Returning an ACK on successful decoding may result in interference at STA2. In this case, a beamformer may be used to direct transmission to AP1. A deferred ACK may be used to transmit an acknowledgement to the transmitter. For example, STA1 and AP1 may negotiate and agree on a maximum deferral time (e.g., or a maximum number of transmissions) within which an STA may send an ACK. If the AP and the STA agree to the possibility of deferred ACKs, the AP may finish transmission and send a deferred ACK request. This may allow the rest of the network to resume transmission. The STA may send the deferred ACK. For example, the STA may send the deferred ACK at its convenience.

Figure 11:
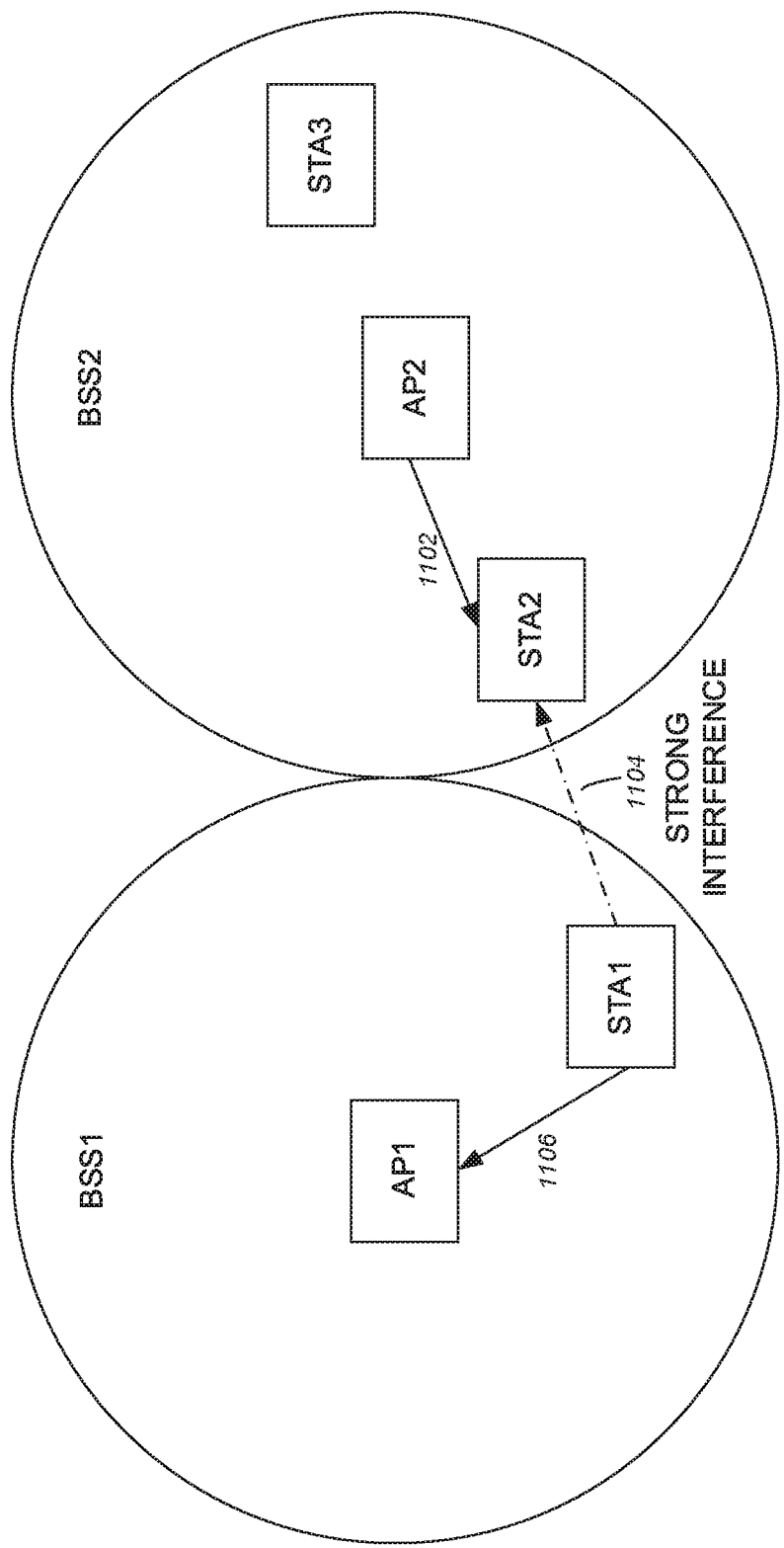
FIG. 11 illustrates an example of a network showing cancellation and a deferred ACK.

FIG. 11 illustrates interference cancellation and a deferred ACK in an exemplary WLAN. Interference cancellation utilizing BSS color may be provided. As illustrated in FIG. 11, AP2 in BSS2 may send a capability request for deferred ACK capability, 1102 to STA2 in BSS2. Information in the capability request may comprise maximum deferral time or maximum number of other STA transmissions that may occur before the AP may decide that the transmission has failed. Information in the request may comprise the time duration within which a successful ACK may be sent, for example, if there is no deferral. The STA may send out an ACK at SIFS-x*slot_time after transmission of the data. This may be to allow the AP to send out a deferred ACK frame at SIFS time, for example, after the AP sends its data to enable resumption of transmission in the BSS.

STA2 may send a capability response indicating that it may have the deferred ACK capability. STA2 may respond with different deferred ACK parameters. STA2 may experience interference 1104 (e.g., severe interference) (e.g., as an edge STA) and may decide to go into deferred ACK mode. STA2 may send a deferred ACK mode request to AP2. AP2 may send a deferred ACK mode response to STA2 indicating transmissions with this STA may be in deferred ACK mode going forward. This may include parameters, such as the parameter x indicating the time AP2 may expect an ACK from STA2, if the transmission is successful.

As illustrated in FIG. 11, STA1 may send information 1106 to AP1 in BSS1. This may cause interference 1104 (e.g., strong interference) on STA2. STA1 may send out information to enable STA2 to identify an out of BSS transmission (e.g., BSS color plus Receiver Address). AP2 may send a frame to STA2, for example, during the time that STA1 may be sending information to AP1. The interference 1104 (e.g., strong interference) may be cancelled, for example, as discussed herein.

Figure 12:
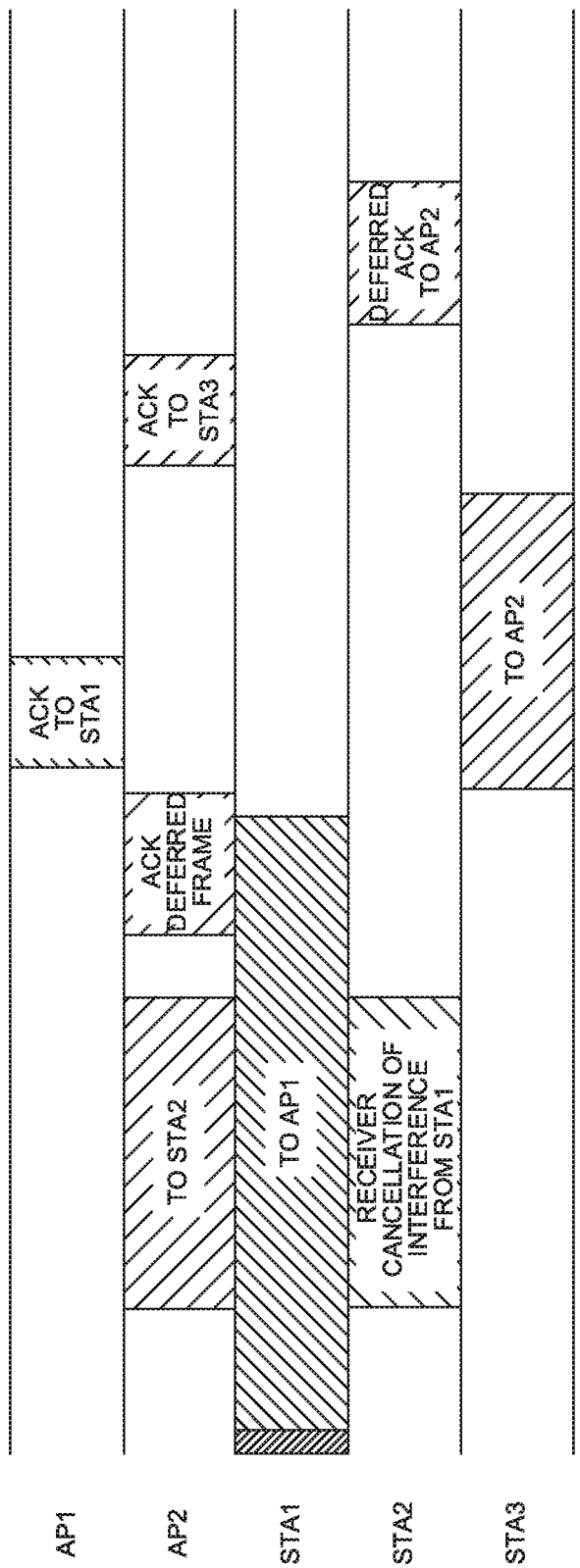
FIG. 12 illustrates an example of a deferred ACK operation.

FIG. 12 illustrates an example of a deferred ACK operation. In acknowledging successful receipt of the transmission, one or more of the following may occur. As illustrated in FIG. 12, AP2 may send information to STA2, for example, with a duration of transmission shorter than the duration of the transmission between STA1 and AP1. STA2 may send an ACK at an SIFS duration after the end of transmission. The ACK sent by STA2 may not impact the data reception at AP1 or the possibility of impacting the ACK reception at STA1.

AP2 and STA2 may implement the deferred ACK, for example, to avoid interfering with the primary transmission from STA1 to AP1. AP2 may wait for an SIFS duration after its transmission and may receive no ACK. AP2 may send out an ACK deferred frame to enable nodes in BSS2 to resume transmission. After completion of the STA1 to AP1 transmission, STA2 may compete for the channel medium and may send the deferred ACK to AP2. This frame may be piggybacked with a data transmission. The deferred ACK from STA2 to AP2 may be transmitted within the maximum deferral time. If maximum deferral time expires, AP2 may assume that the transmission has failed and re-transmit the information to STA2.

Figure 13:
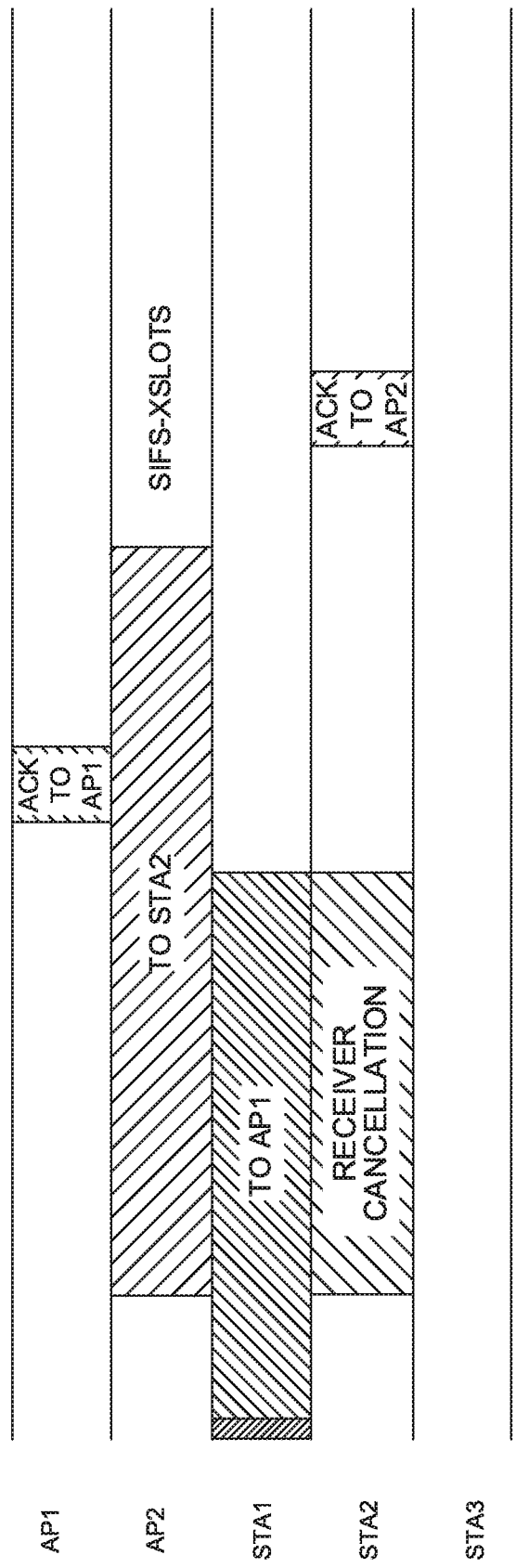
FIG. 13 illustrates an example of an ACK operation.

In acknowledging successful receipt of the transmission, one or more of the following may occur. FIG. 13 illustrates an example of an ACK operation. As illustrated in FIG. 13, STA1 may send information to AP1 with a duration of transmission that goes beyond the duration of transmission between AP2 and STA2. STA2 may wait SIFS-x*slot_time after the completion of data transmission. STA2 may transmit the ACK to AP2.

STA2 may move to an environment where interference (e.g., severe interference) may not be an issue. STA2 may send a deferred ACK mode stop request to AP2. AP2 may send a deferred ACK mode stop response to STA2 indicating deferred ACK mode may be stopped going forward.

Transmit scheme specific BSS color may be provided. BSS color may be extended to include information on a specific technique that may be used in a transmission. Extended BSS color may enable a STA in the neighboring BSS to identify that the transmission may be from another BSS. Extended BSS color may enable the STA in the neighboring BSS to identify characteristics of the specific scheme used to transmit in the neighboring BSS and modify its behavior accordingly.

Transmit scheme specific BSS color examples may allow STAs in neighboring BSSs to adapt to the transmissions in the OBSS. As described herein, a scheme may include OBSS information and/or scheme specific information. Examples that may benefit from the inclusion of both OBSS information and scheme specific information may include one or more of the following: downlink (DL) OFDMA, uplink (UL) OFDMA, OFDM, BSS silencing, Interference avoidance with sectored transmission, and/or DL/UL OFDMA with peer-to-peer (P2P) transmission.

In DL OFDMA, OFDMA may be used with one or more of the bands or the AP may transmit to cell-center STAs. In DL-OFDMA, one or more STAs in neighboring BSSs may use additional color information to identify where and when the STAs in the neighboring BSSs may be able to transmit with minimal interference to the OFDMA transmission. For OFDMA transmission, the sub-bands may be fractions of a 20 MHz band (e.g., for sub-channelized OFDMA transmission) or they may be 20 MHz bands (e.g., for channel-based OFDMA transmission).

In UL OFDMA, STAs in neighboring BSSs may use the additional color information to identify where and when they may be able to transmit with minimal interference by spatial re-use of a band. In UL OFDMA, OFDMA may be used in the uplink transmission in the neighboring BSS (e.g., as opposed to OFDM that takes up the entire bandwidth). In UL OFDMA, one band may have an STA close to the AP. For OFDMA transmission, the sub-bands may be fractions of a 20 MHz band (e.g., for sub-channelized OFDMA transmission) or they may be 20 MHz bands (e.g., for channel-based OFDMA transmission).

In OFDM, where OFDM may be used in the neighboring BSS, the BSS may indicate when a STA that is robust in OBSS interference may be transmitting and/or receiving information. Neighboring STAs may use this information when transmitting.

In BSS silencing, in a dense network with OBSS transmissions, a BSS may indicate BSS color and its intention to stay silent at a desired time and for a desired duration. Neighboring BSSs may use this information to determine when to transmit (e.g., determine to transmit during the silence period), which may improve the performance of the network.

In interference avoidance with sectored transmission, in a dense network, a BSS may indicate its color and the sector to which a DL transmission may be directed and the duration of the transmission. Neighboring BSSs may use this information to improve the performance of the network. For example, the OBSS may identify a specific orthogonal beam to use when transmission with a specific enhanced color may be detected.

In DL/UL OFDMA with peer-to-peer (P2P) transmission, where OFDMA may be used with one or more of the bands empty or silenced, P2P STAs in the same BSS may use the additional color information to identify where and when they may be able to transmit with minimal interference to the OFDMA transmission.

OBSS information and/or scheme specific information may be transmitted in the SIG field of a transmitted frame. Information that may be transmitted may comprise: Uplink Indication bit; Transmit Node/BSS identification; scheme identification information; and/or scheme specific information.

Uplink Indication bit may be transmitted to indicate if the transmission is an uplink or downlink transmission. Transmit Node/BSS identification may be transmitted. For example, for downlink transmission (e.g., uplink indication bit set to 0), the transmit Node/BSS identification may be the BSS color and the MAC address or Partial AID of the BSS. The BSS color may be used to identify transmissions associated with a STA's own BSS or OBSS. For uplink transmission (e.g., uplink indication bit set to 1), the Transmit Node/BSS identification may be the MAC address or Partial AID of the transmitting node. In this case, the MAC address or partial AID stored in the receive address may enable the STA to identify transmissions associated with its BSS and/or OBSS. The BSS color may be transmitted in both uplink and downlink transmissions.

Scheme identification information may be transmitted (e.g., the information may be conveyed via a combination of bits). The scheme used may be transmitted in the SIG. For example, a 3-bit field may be used in combination with the uplink indication bit to identify the specific scheme used. For example, 000 may indicate OFDM (default); 001 may indicate OFDMA; 010 may indicate BSS silencing; 011 may indicate interference avoidance with sectored transmission; 100 may indicate OFDMA with band silencing; 101, 110, and 111 may be reserved. The direction bit may be combined with the scheme bit to identify whether UL/DL OFDMA, UL/DL OFDM is utilized.

Scheme specific information may be transmitted (e.g., the information may be conveyed via a combination of bits). This may be used to identify information utilized for a scheme. For example a 4-bit field may be used in conjunction with the scheme identification information to communicate information about that specific scheme. For example, identical fields may mean different things depending on the specific scheme used. For example, with a format of {Direction bit} {scheme} {information}, {DL} {OFDMA} {1101} may indicate uplink OFDMA with 4 sub-bands with sub-band 3 available for OBSS transmission due to an STA that may be robust to interference. {DL} {Silencing}{1000} may indicate downlink silencing with sector 0 active.

For UL/DL OFDMA, bands may be identified that may be used by neighboring BSSs during a transmission. Examples may include identifying bands that may be utilized for transmission to BSS-center STAs in the neighboring BSS as the reception at the AP (e.g., in UL transmission) or at the STA (e.g., in DL transmission). Such bands may be more robust to interference.

For UL/DL OFDMA, bands may be identified that may not be used by neighboring BSSs during a transmission. Examples may include bands that may be utilized for transmission to BSS-edge STAs in the neighboring BSS as the reception at the AP (e.g., in UL transmission) or at the STA (e.g., in DL transmission). Such bands may be less robust to interference.

For OFDM, it may be identified when a STA that is robust to transmission is transmitting or receiving. The neighboring STAs may use this information when transmitting. In BSS silencing, the commencement and duration of the silence period may be identified. For interference avoidance in sectored transmission, the commencement and duration of the transmission may be identified. For example, the active sector and active sector direction in OBSS may be identified. The sectors that may not be used by any OBSS transmission may be identified. For CCA threshold information, the enhanced color information may comprise a desired Rx sensitivity/threshold, such as described herein.

Figure 14:
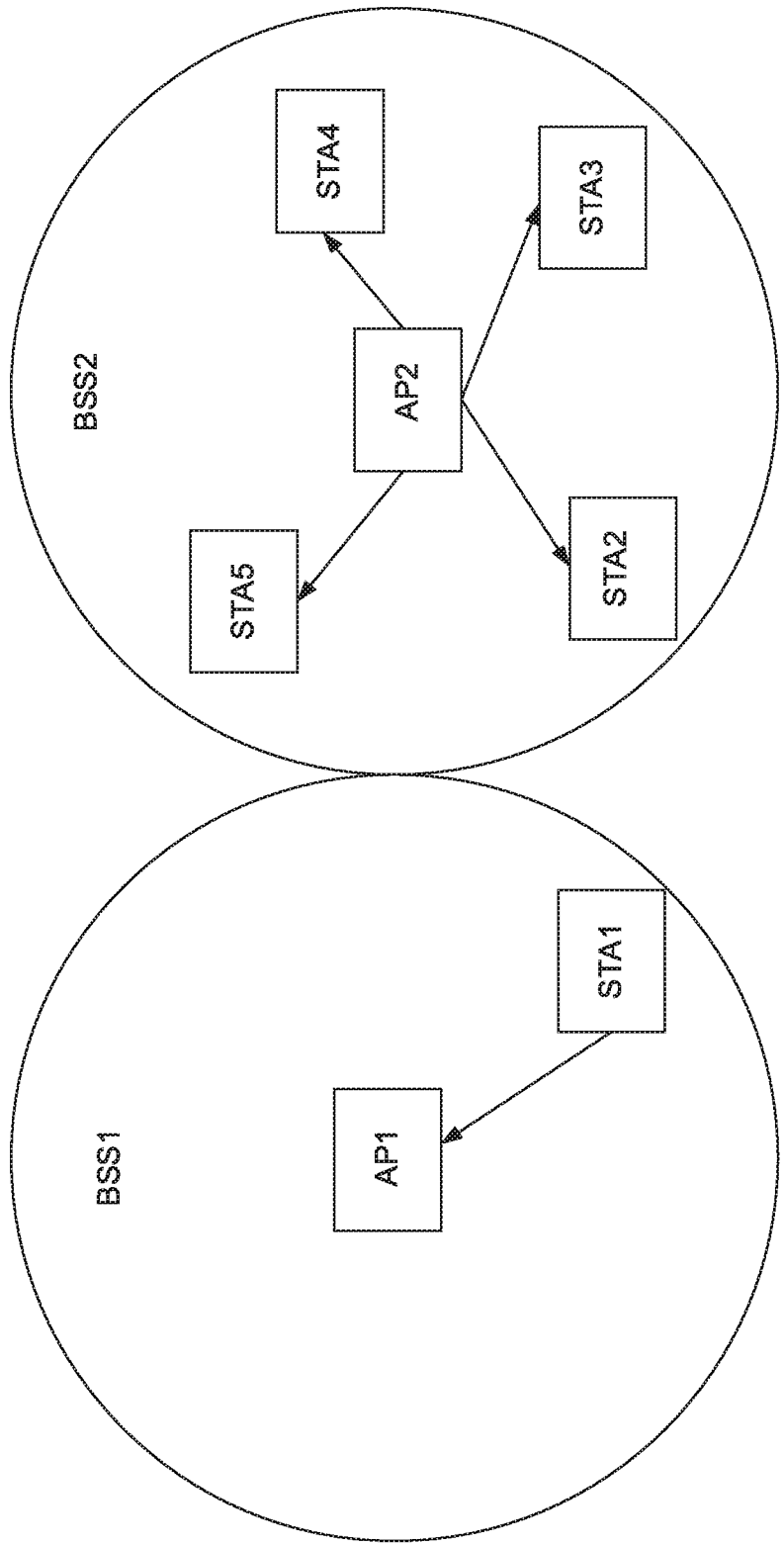
FIG. 14 illustrates an example of uplink/downlink (UL/DL) orthogonal frequency divisional multiple access (OFDMA).
Figure 15:
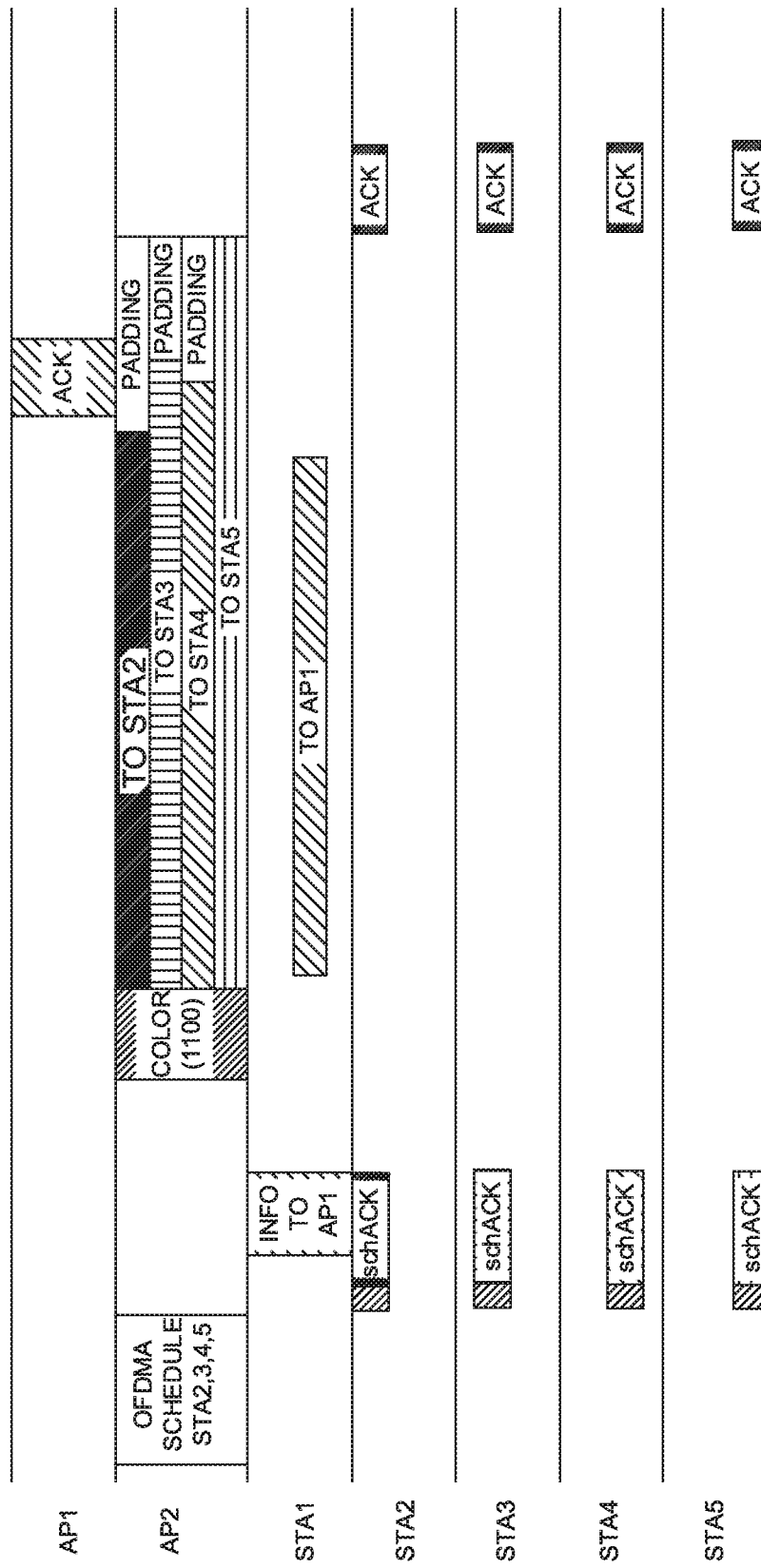
FIG. 15 illustrates an example of UL/DL OFDMA Packet Exchange Type 1.
Figure 16:
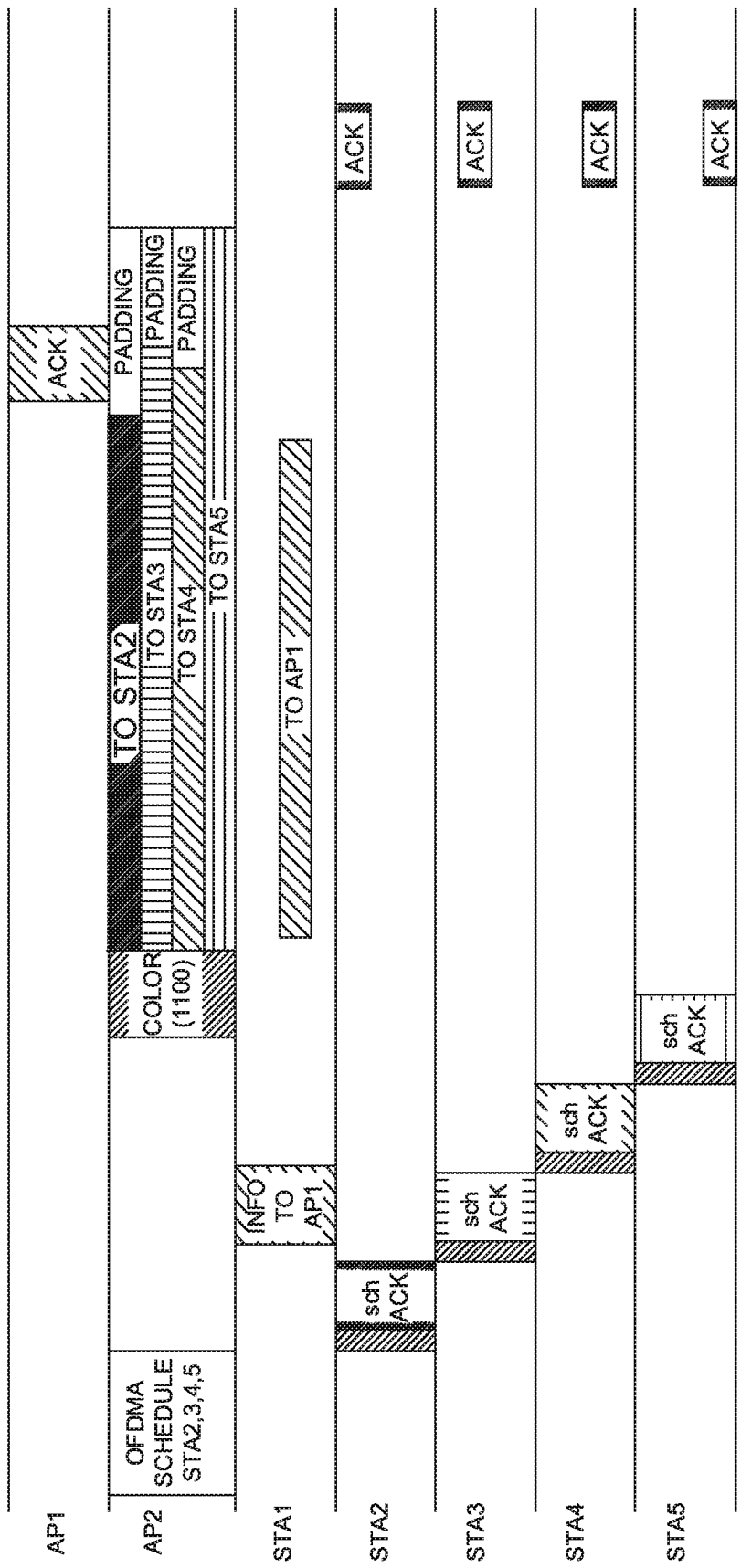
FIG. 16 illustrates an example of UL/DL OFDMA Packet Exchange Type 2.
Figure 17:
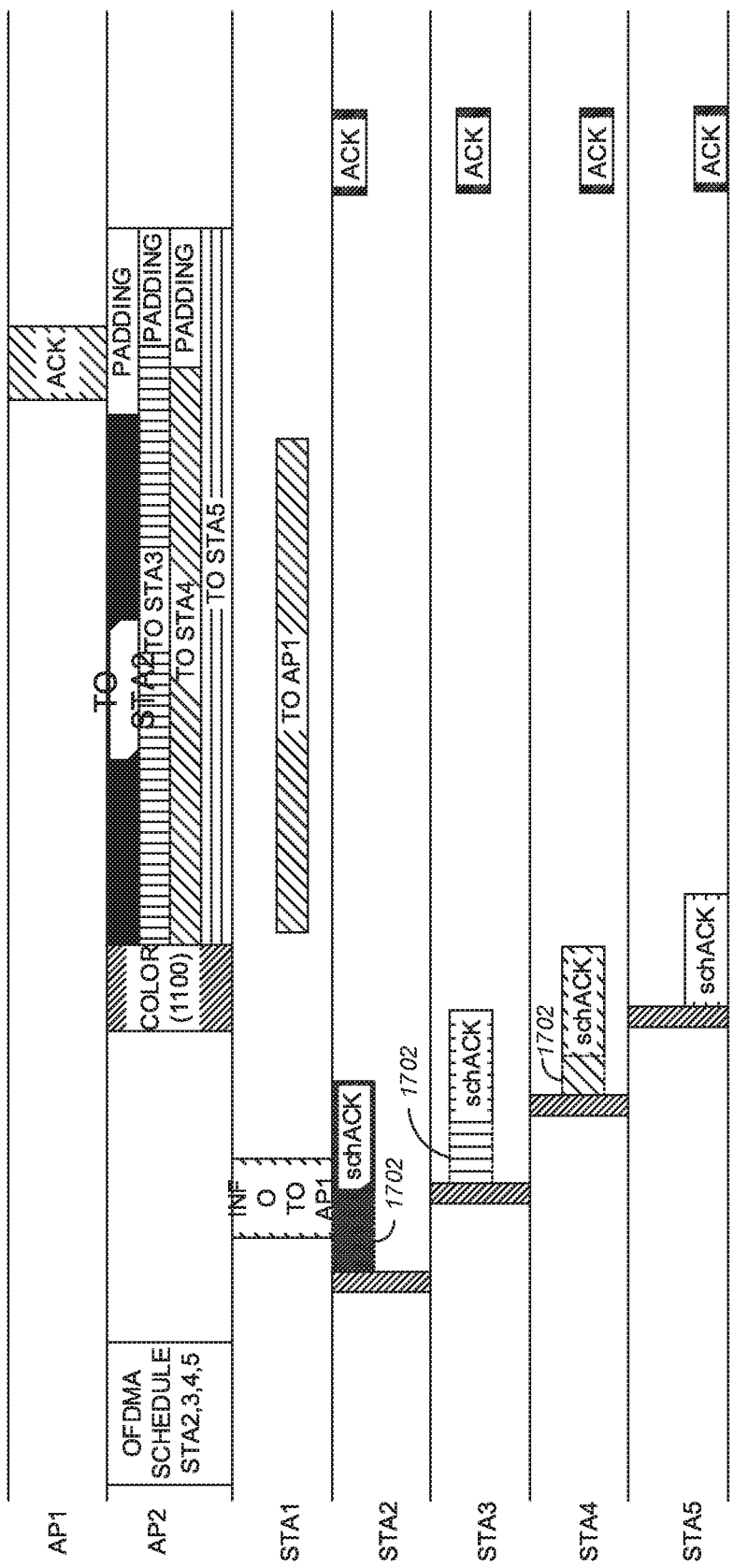
FIG. 17 illustrates an example of UL/DL OFDMA Packet Exchange Type 3.

UL/DL OFDMA transmission with enhanced BSS color may be provided. FIG. 14 illustrates an example of UL/DL OFDMA WLAN system. FIG. 15 illustrates an example of an UL/DL OFDMA Packet Exchange Type I. FIG. 16 illustrates an example of an UL/DL OFDMA Packet Exchange Type 2. FIG. 17 illustrates an UL/DL OFDMA Packet Exchange Type 3. Examples described herein may be used in downlink OFDMA. For example, a DL OFDMA transmission may have four sub-bands. As illustrated in FIG. 14, FIG. 15, FIG. 16, and FIG. 17, AP2 in BSS 2 may initiate a downlink OFDMA transmission. AP2 in BSS 2 may indicate in the SIG field that the sub-channels occupied by STA4 and STA5 may be robust to OBSS interference, for example, due to their proximity to the AP. STA1 in BSS1 may overhear the BSS2 transmission and schedule its transmission in either or both of the subchannels.

As illustrated in FIGS. 14, 15, 16, and 17, AP2 in BSS2 may send information to STAs in its BSS using OFDMA. For example, BSS 2 may initiate a downlink OFDMA transmission with STA2 (e.g., using channel 1), STA3 (e.g., using channel 2)), STA4 (e.g., using channel 3) and STA5 (e.g., using channel 4) by sending an OFDMA schedule frame to some or all the STAs. Each of the STAs may reply with an OFDMA response frame. The AP may transmit information to the STAs. The STAs that successfully receive the transmission may reply with an acknowledgement (ACK).

Enhanced BSS color information may be transmitted in the SIG field of one or more (e.g., all) of the following frames. The enhanced color information may indicate (e.g., by transmitting {1100}) that one or more channels (e.g., channel 3 and/or channel 4) are available for transmission. An OFDMA/COBRA channel may reserve or schedule an OFDMA/COBRA frame to reserve channel resources for the OFDMA/COBRA transmission and/or indicate the sub-channels used by one or more STAs (e.g., STA2, STA3, STA4 and STA5). One or more OFDMA/COBRA response frames from one or more (e.g., each) of STAs (e.g., STA2, STA3, STA4 and STA5) may be used to acknowledge the receipt of the schedule frame (schACK). One or more (e.g., each) of the STAs may send out the entire enhanced color information to provide OBSS STAs close to a STA information about that STA. One or more (e.g., each) of the STAs may send (e.g., only send) basic BSS color information, information on the specific scheme, and/or information on the sub-channel to which the STA may have been assigned (e.g., only assigned).

As illustrated in FIG. 15, in Type I packet exchange, the color information may be sent on one or more (e.g., each) of the sub-bands. As illustrated in FIG. 16, in Type II packet exchange, the color information may be sent over a channel bandwidth (e.g., the entire channel bandwidth). As illustrated in FIG. 17, in Type III packet exchange, the color information may be sent over the bandwidth (e.g., entire bandwidth) and may be time delayed, for example, to avoid overlap. As illustrated in FIG. 17, the schACK frame associated with each of the STAs may be sent on the respective sub-band at the same time. One or more of the schACK frames may be preceded by blank transmission or dummy information 1702. This dummy information 1702 may be skipped by the receiver, for example, based on the position of the STA in the OFDMA schedule group. An OFDMA data frame may be sent from the AP to each of one or more STAs (e.g., each of STA2, STA3, STA4 and STA5). The ACK frames may be sent from one or more STAs (e.g., each of STA2, STA3, STA4 and STA5). The enhanced color information transmitted may be similar to that transmitted in the schACK. The enhanced color information may be identical and/or transmitted in one or more (e.g., all) of the frames in the OFDMA transmission frame exchange.

As illustrated in FIG. 15, FIG. 16, and/or FIG. 17, for example, STA1 in BSS1 may overhear the transmission from BSS2, for example, from an AP2 or STA2 in BSS2. For example, in a dense environment, STA1 may overhear a COBRA schedule frame from AP2. For example, the received frame may be received with a power greater than the receiver sensitivity of STA1. STA1 may hear a schACK frame from STA2.

STA1 may decode the preamble of the received transmission from BSS2. For example, the preamble may comprise the updated SIG field with the enhanced BSS color information. STA1 may resume CSMA/CA channel access on one or more channels (e.g., channels 3 and channel 4). STA1 may send information to AP1 on either of the channels (e.g., channel 3 as illustrated in FIG. 15, FIG. 16, FIG. 17).

STA1 in BSS1 may indicate to AP1 in BSS1 identification of the channels STA1 may use and/or the channels STA1 may not use. For example, STA1 may communicate such indication in response to a downlink OFDMA/COBRA channel request (e.g., from AP1 in BSS1). STA1 may indicate that it may use one or more channels (e.g., only channel 3 or channel 4) and/or that it may not use one or more channels (e.g., channel 1 or 2)). STA1 may send an uplink OFDMA/COBRA data request (e.g., to AP1) with information that it may use channel 3 or channel 4 (e.g., only channel 3 or channel 4) and/or that it may not use channel 1 or 2. STA1 may send the information to an AP in the STA1's BSS (e.g., AP1 in BSS1) with minimal impact on an AP in an OBSS (e.g., AP2 in BSS2)).

Uplink COBRA/OFDMA transmission may be similar to downlink OFDMA, as described herein. For example, the STA may send a request to the AP for scheduling based on data in its buffer. The STA may receive an OFDMA scheduling frame from the AP to transmit in a specific band. The STA may send a schACK with enhanced color information to the AP. The STA may send data with enhanced color information to the AP.

Figure 18:
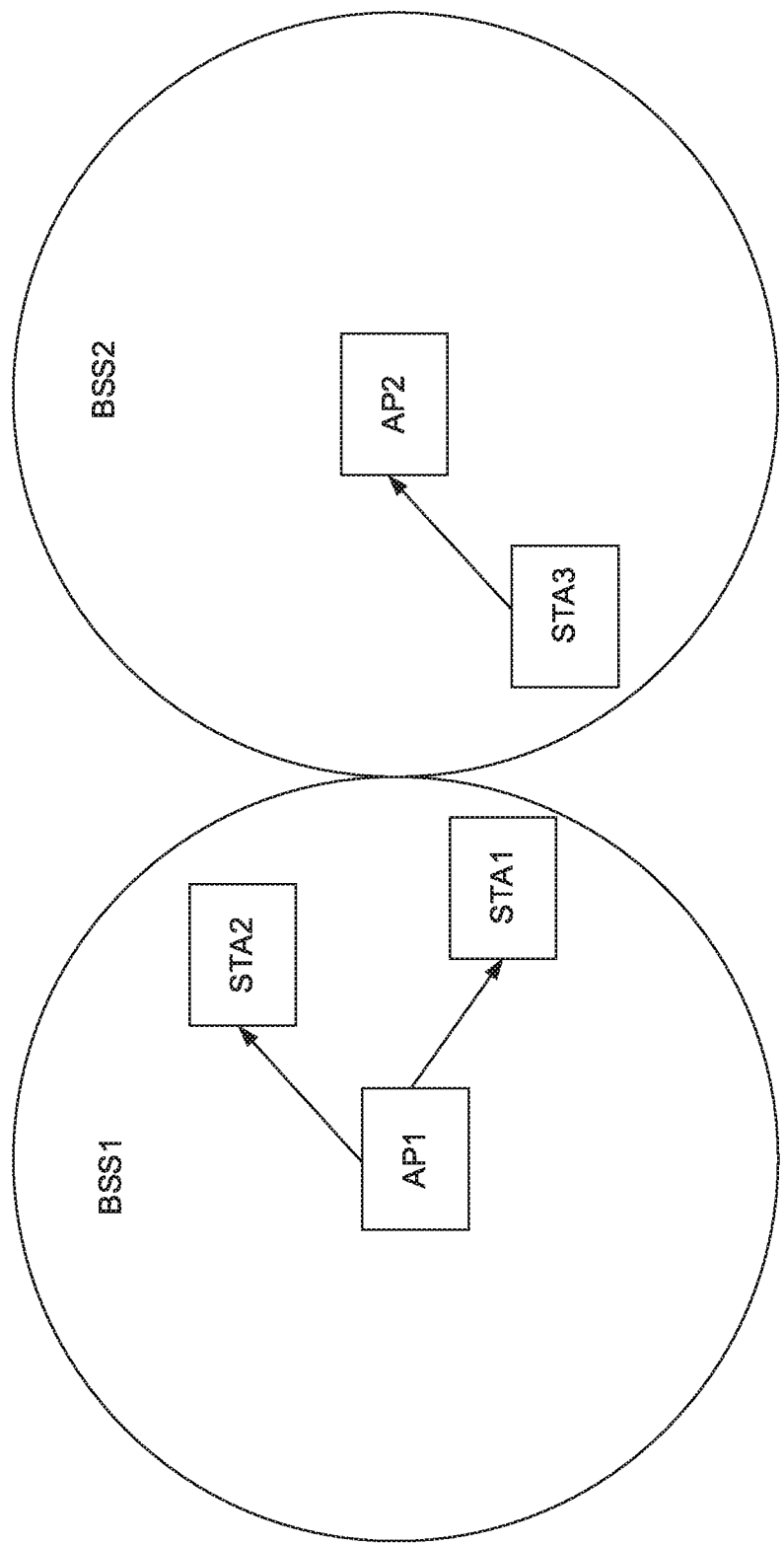
FIG. 18 illustrates an example of UL/DL OFDM.
Figure 19:
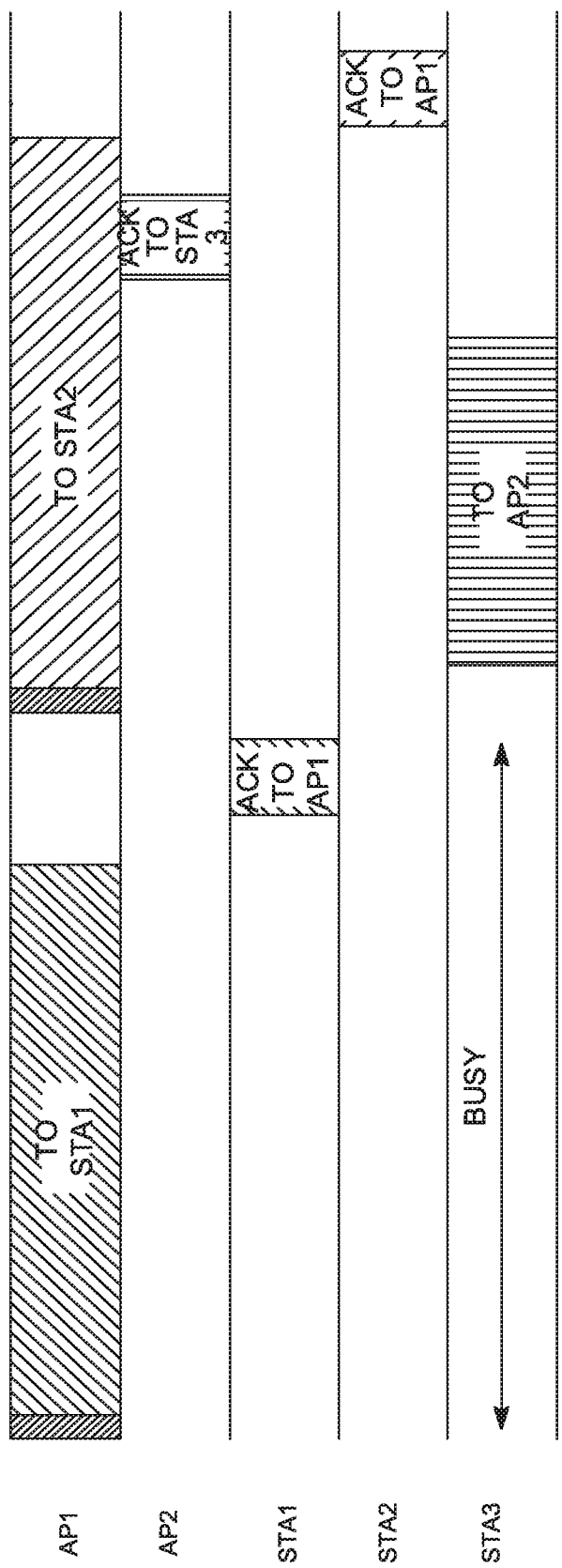
FIG. 19 illustrates an example of UL/DL OFDM Packet Exchange.

UL/DL OFDM transmission with enhanced BSS color may be provided. FIG. 18 illustrates an example of an UL/DL OFDM transmission with enhanced BSS color. FIG. 19 illustrates an example of an UL/DL OFDM packet exchange. As illustrated in FIG. 18 and FIG. 19, AP1 in BSS1 may be in communication with (e.g., send transmission to) STA1 and/or STA2. Even though the CCA threshold and BSS color may be identical for both transmissions, the use of enhanced BSS color may enable STA3 in BSS2 to transmit, for example, when the recipient of the primary transmission may be robust to interference.

As illustrated in FIG. 18 and FIG. 19, AP1 in BSS1 may send an OFDM transmission to STA1. STA1 in BSS1 may not be robust to OBSS interference from STA3 in OBSS BSS2. AP1 may send enhanced color information in the preamble of its transmission, for example, indicating that it may be using OFDM transmission and that the channel may not be used. STA3 in OBSS BSS2 may overhear the transmission from BSS1 and the enhanced color information. STA3 may set its channel to busy and may not transmit.

AP1 in BSS1 may send an OFDM transmission to STA2, for example, at another time. STA2 may be robust to OBSS interference from STA3 in OBSS BSS2. AP1 may send enhanced color information in the preamble of its transmission, indicating that it is using OFDM transmission and/or that the channel may be used (e.g., concurrently). STA3 in OBSS BSS2 may overhear the transmission from BSS1 and/or the enhanced color information. STA3 may set its channel to idle and/or may transmit.

Interference avoidance with sectored transmission with enhanced BSS color may be provided. An AP-STA pair may indicate that the AP and the STA are transmitting using a sectorized antenna. The initial omni-directional transmission may indicate information comprising the use of sectorized transmission, the BSS color/RA information and/or the direction of transmission. This information may be predetermined by the standard or a discovery example/procedure may assign directions to specific sequences. An OBSS STA/AP may use this information to modify its CCA threshold during that transmission and/or restrict the sectors it may use to transmit information to its receiver. This example may differ from spatially orthogonal transmission proposed in 802.11ah. In 802.11 ah, spatial orthogonality may be implicitly assumed. The BSS color may be used to send (e.g., explicitly send) information to OBSS STAs.

AP1 in BSS1 may transmit using an omni-directional antenna indicating that it may use a specific sector. AP1 may transmit its BSS color and/or information on the sector used. For example, AP1 may send out a sector discovery frame. The AP may transmit a series of alternating omni-direction and/or sectorized transmissions. The omni-directional transmission frame may comprise the sector ID and/or the sector sub-color information, for example, that may be followed by transmission of a null data packet on the sector of interest. This may enable STAs in and outside the BSS (e.g., BSS1) to identify the sector and its sector-subcolor.

An omni-directional frame may be transmitted by AP1 that may enable mapping of the sector ID to the sector sub-color. One or more (e.g., each) STA may reply to the AP with its preferred sector and/or the corresponding sector sub-color. This may enable STAs in neighboring BSSs map sector sub-colors to the corresponding sector.

STA1 may reply to AP1 with an ACK frame. The ACK frame may comprise the enhanced BSS color that may include information about one or more of the following: the BSS in which the transmission may originate, the scheme (e.g., sectorized antenna transmission), or the direction of the transmission. AP1 may commence transmission to STA1. STA2 in BSS2 may overhear the transmission from either AP1 or STA1. Based on information that transmission may occur within a separate BSS, STA2 may modify its CCA threshold for the duration of the transmission. Based on the information that the transmission may be occurring in BSS1 in a direction, STA2 may modify its transmission scheme. In an example, STA2 may stop transmission, for example, if the transmission in BSS1 may be taking place in a direction. In an example, STA2 may transmit to AP2 using a lower transmit power or an orthogonal/semi-orthogonal sector direction, for example, if the transmission in BSS1 may be taking place in a direction.

UL/DL OFDMA transmission and Peer-to-Peer (P2P) transmission with enhanced BSS color may be provided. An AP may communicate with multiple STAs in the uplink and/or downlink, for example, using OFDMA. A pair of STAs in the network may transmit directly to each other. The use of enhanced BSS color may facilitate transmission (e.g., simultaneous transmission) of data to/from the AP the STAs associated with the AP, and between the P2P STA pair.

Figure 20:
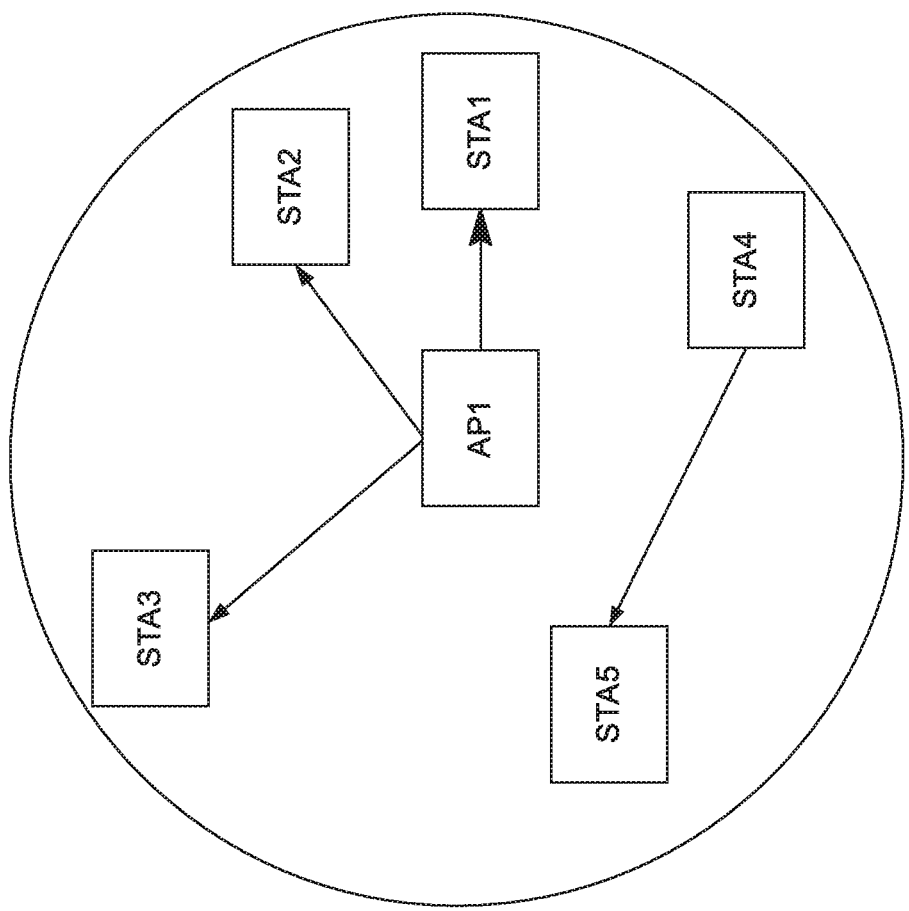
FIG. 20 illustrates an example of OFDMA with Peer-to-Peer transmission with enhanced BSS color.
Figure 21:
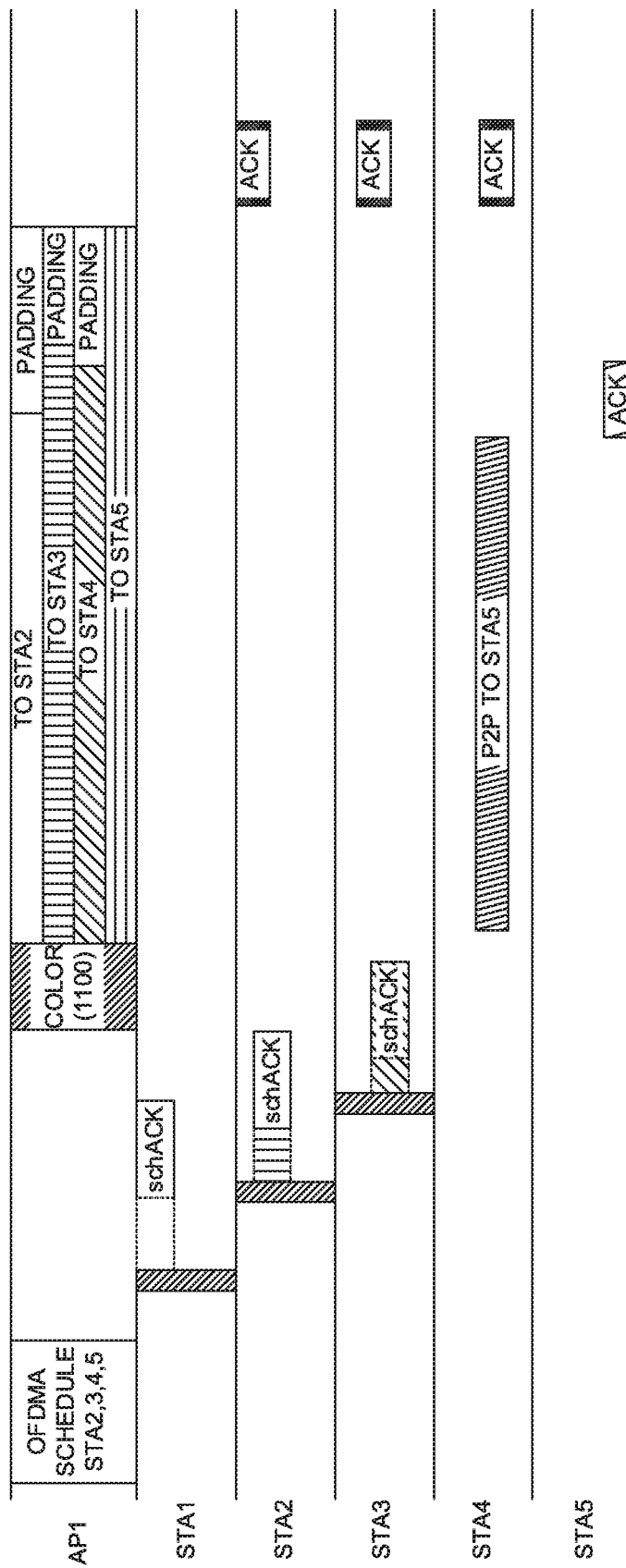
FIG. 21 illustrates an example of packet exchange.

FIG. 20 illustrates an example of OFDMA transmission with Peer-to-Peer transmission using enhanced BSS color. FIG. 21 illustrates an example of packet exchange related to the entities in FIG. 20. As illustrated in FIG. 20 and FIG. 21, AP1 may send information to STAs in its BSS, for example, using OFDMA. For example, AP1 may initiate a downlink OFDMA transmission with STA1 (e.g., using channel 1), STA2 (e.g., using channel 2)), and STA3 (e.g., using channel 3) by sending an OFDMA schedule frame to one or more (e.g., all) STAs. Each of the STAs (e.g., STA1, STA2, and STA3) may reply with an OFDMA response frame (e.g., using schACK frame). The AP may transmit data to the STAs. The STAs that successfully receive the data may reply with an ACK.

Enhanced BSS color information may be transmitted in the SIG field of any (e.g., or all) of the OFDMA/COBRA channel reservation or schedule frame, one or more OFDMA/COBRA response frames, the OFDMA data frame, and/or one or more ACK frames. For example, the enhanced color information may comprise {1110} indicating that a channel (e.g., channel 4) is silenced and available. As illustrated in FIG. 21, the frame, e.g., OFDMA/COBRA channel reservation frame or schedule frame may be utilized to reserve one or more channel resources for the OFDMA/COBRA transmission. The OFDMA/COBRA channel reservation frame or schedule frame may be utilized to indicate the sub-channels used by one or more STAs (e.g., STA1, STA2, and STA3). The OFDMA/COBRA response frames from one or more STAs (e.g., each of STA1, STA2, and STA3) may be sent to acknowledge receipt of the schedule frame (e.g., using the schACK frame). One or more (e.g., each) STA may send out the enhanced color information (e.g., entire enhanced color information) to enable the OBSS STAs close to the STA to get information about that STA (e.g., STA only). For example, one or more (e.g., each) STA may send (e.g., may only send) basic BSS color information, information on the specific scheme, and/or information on the sub-channel to which it may have been assigned (e.g., only to which is may have been assigned). Type I, Type II and Type III color information as discussed herein may be used.

As illustrated in FIG. 21, the OFDMA data frame may be sent from the AP (AP1) to one or more (e.g., each) of STA1, STA2, and STA3. The ACK frames may be sent from one or more (e.g., each) of STA1, STA2, and STA3. The enhanced color transmitted may be similar to that transmitted in the OFDMA schedule frame. The enhanced color information may be identical and transmitted in any or all of the frames in the OFDMA transmission frame exchange. STA4 in BSS1 may overhear the transmission from the AP (API). On decoding the preamble (e.g., the updated SIG field with the enhanced BSS color information), STA4 may access channel 4 and may transmit a P2P frame to STA5. STA5 may follow with an ACK of the received P2P frame.

Figure 22:
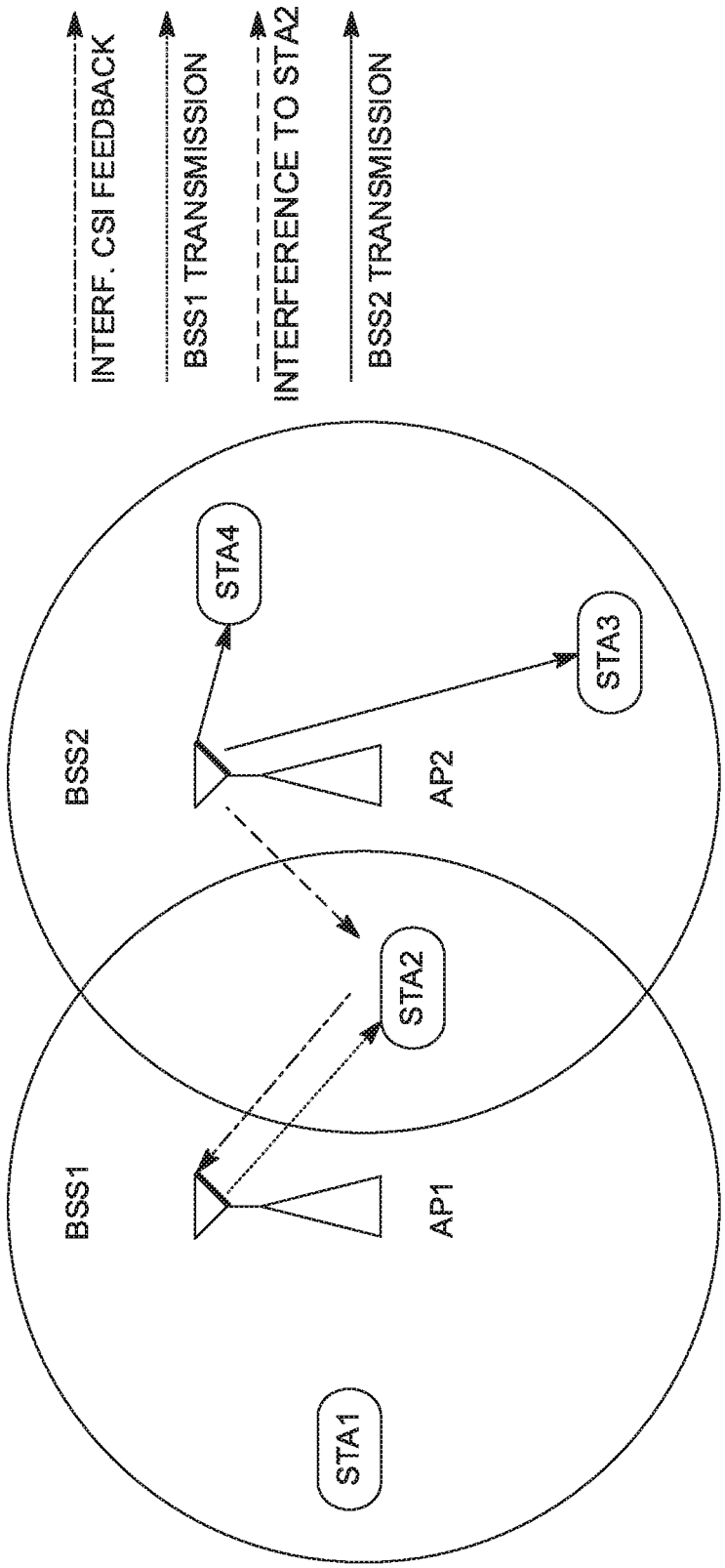
FIG. 22 illustrates an example of an overlapping BSS (OBSS) interference and an example interference cancellation transceiver.

Spatial orthogonal transmission may be provided. FIG. 22 illustrates an example of OBSS interference and interference cancellation transceiver scheme. Adjacent BSSs may be densely deployed, for example, in shopping malls or apartments, where the coverage areas of adjacent BSSs are overlapped with each other. The STAs in a BSS may be located in the overlapping coverage area of two or more BSSs. As illustrated in FIG. 22, STA2 belonging to its BSS, e.g., BSS1 may be located in the coverage area of an OBSS, e.g., BSS2 as well as the coverage area of its BSS. AP2 in the OBSS may transmit signals to its associated STAs, such as STA3 and STA4 in FIG. 22. STA2 may not be able to communicate with its AP in STA2's BSS, e.g., AP1 during the duration of NAV set by AP2. STA2 may have to be idle for the duration of AP2 transmission.

Examples described herein may allow STA2, as illustrated in FIG. 22, to transmit and/or receive under certain conditions. For example, STA2 may use high throughput long training field (HT-LTF) or very high throughput long training field (VHT-LTF) in transmission from AP2, for example, to estimate the interference channel between AP2 and STA2. This interference channel state information may be utilized to assist STA2's communication (e.g., simultaneous communication) with AP1 in the duration of AP2's NAV duration. Multiple antenna configuration may be utilized for AP1, AP2 and STA2. As described herein, BSS color field in the SIG field may be used to identify information from an OBSS.

A STA may identify an interference transmission from APs in OBSSs and may coordinate its communication (e.g., simultaneous communication) with AP in the STA's own BSS as described herein. As illustrated in FIG. 22, in the OBSS, AP2 may initialize communication with its associated STA3 and STA4. The BSS color and the total number of spatial streams may be indicated in the SIG field of the preamble. STA2 may be associated with AP1. STA2 may hear the RTS from AP2 and/or prepare to receive signals from AP2. STA2 may receive the data packet from AP2. STA2 may choose to estimate the channel and/or check the BSS color field. STA2 may determine that the BSS color does not match the BSS color of the AP with which it may be associated. If STA2 misses the RTS sent by AP1 or the OBSS does not use the RTS/CTS frame exchange, STA2 may track the start of a packet by detecting the STF on the interfered channel. When a packet start point is detected, STA2 may estimate the channel and/or check the BSS color field. STA2 may know that the transmission may be in the OBSS by the BSS color information. STA2 may choose to stop packet detection on the interfered channel and/or keep mute during the transmission in the OBSS, for example, due to power consumption limit. STA2 may calculate the spatial directions in the null space of the interference signal. STA2 may choose CDMA-coded signal and/or a feedback channel to send the orthogonal directions toward the interference channel to AP1. AP1 may receive the feedback information from STA2. AP1 may perform pre-coding, for example, to control its transmitted signal in the spatial direction that may be orthogonal to the subspace occupied by the interference signal at the receiver of STA2. STA2 may use receiver combining weights matched to AP1's transmission direction, for example, to receive signal from AP1 in the NAV duration of AP2.

Orthogonal directions may be determined as described herein. AP2 may use M antennas to transmit the interference signal $x_1$. AP1 and STA2 may have N>M antennas (e.g., may be required to have N>M antennas). STA2 may use the preamble part of the packet sent by AP2, for example, to perform channel estimation. The estimated interference channel between STA2 and AP2 may be denoted by the N×M matrix $H_I$. STA2 may calculate the SVD decomposition of $H_I$.

$$H_I = U \Sigma V = [U_1 U_2] \Sigma V,$$

where U may be an N×N unitary matrix, V may be an M×M unitary matrix, and $\Sigma$ may be the N×M matrix with singular values on its upmost main diagonal. $U_1$ may be an N×M submatrix of U holding the eigenvectors which may span the range space of $H_I$. $U_2$ may be an N×(N−M) submatrix whose column vectors may lie in the null space of $H_I$.

Denoting $U_2 = [u_1^{(2)}, u_2^{(2)}, \ldots, u_{N-M}^{(2)}]$, where $u_i^{(2)}$, $i=1,2, \ldots, N-M$ may be the column vectors of $U_2$, STA2 may choose some column vectors of $U_2$ as desired beamforming vectors. STA2 may inform AP1 to use these desired beamforming vectors to transmit signals.

Assuming that K column vectors in $\{u_i^{(2)}, i=1,2, \ldots, N-M\}$ are selected as the desired beamforming vectors, the K beamforming vectors may form a matrix $U_D$. STA2 may send feedback information of $U_D$ to AP1. The N×N channel matrix between AP1 and STA2 may be denoted by $H_D$. AP1 may have the knowledge of CSI between itself and STA2. AP1 may employ precoding matrix $P_D = H_D^{-1} U_D$ to transmit K information symbols $x_D$ to STA2, for example, during the transmission. The received signal at STA2 may be expressed by, $$y = H_D P_D x_D + H_I x_I + n$$

-continued
$$= U_D x_D + H_I x_I + n.$$

At the receiver, STA2 may utilize $U_D^H$ as the combining matrix. Since the desired signal beamforming vectors $U_D x_D$ may be in the null space of the interference signal and the combining matrix may be matched to the desired signal, the interference may be eliminated (e.g., completely eliminated), for example, after a combining operation, such as $$U_D^H y = U_D^H U_D x_D + U_D^H H_I x_I + U_D^H n = x_D + U_D^H n.$$

The equivalent noise variance may not strengthened, for example, since $U_D^H$ may be comprised of some column vectors of a unitary matrix. The computation of SVD at STA2 may be low. The more computational cost may be in the beamforming processing at AP1. The feedback of interference direction $U_D$ by STA2 may cause interference to the closely located STAs associated with AP2. CDMA coded feedback or separate frequency feedback channel may be helpful to reduce STA2's interference to the STAs in adjacent OBSS. Transmit power control may be used to reduce the interference caused by STA2.

Figure 23:
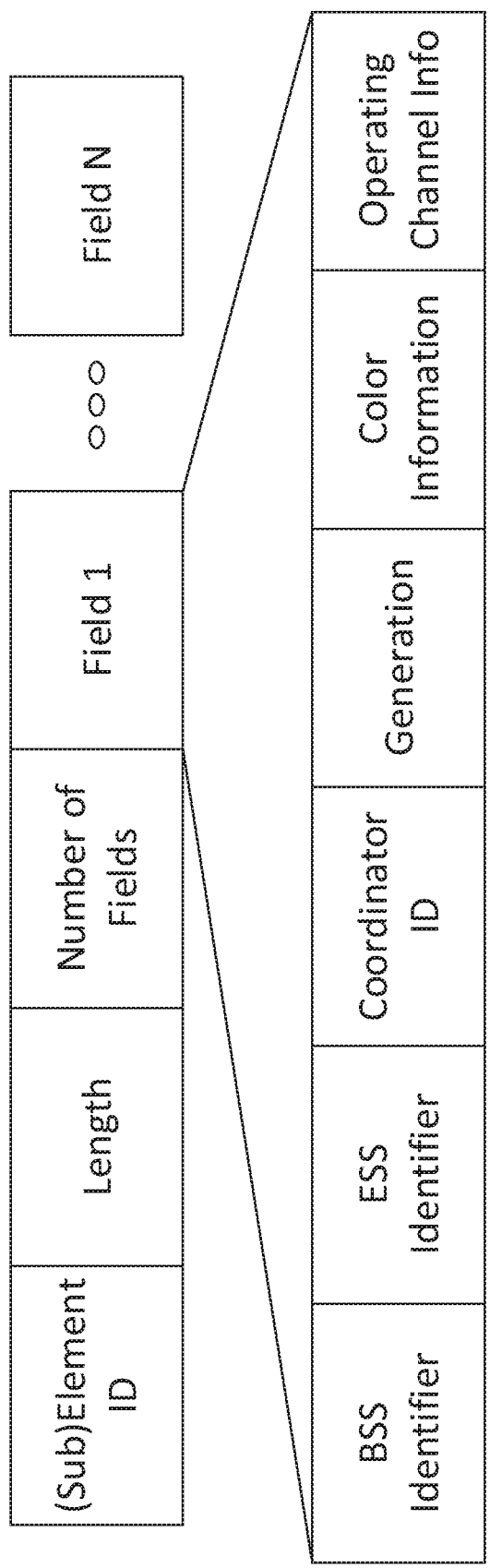
FIG. 23 illustrates an example of an OBSS Reporting Element.

BSS color modification and coordination may be described herein. FIG. 23 illustrates an example of an OBSS reporting element. An STA may detect a BSS other than its own BSS, for example, using the color of its current BSS to compare to color(s) indicated in received transmission(s) (e.g., in the SIG field). The STA may report such detection to its associated AP. For example, the STA may use an OBSS Reporting element, as illustrated in FIG. 23, to report information and/or BSS colors of OBSSs the STA may have detected.

The OBSS Reporting Element (e.g., an OBSS (Sub) Element) may include one or more of the following fields: (Sub)Element ID; length; number of fields; or OBSS Reporting Field 1 to Field N. The (Sub)Element ID may include an identifier that the current (Sub)Element may be an OBSS Reporting (Sub)Element. The length field may include the length of the OBSS Reporting (Sub)Element. The number of fields field may indicate the number of OBSS Reporting fields in the current OBSS Reporting (Sub)Element. The number of fields field may be omitted, for example, if a fixed number (e.g., one) OBSS Reporting Field is included. One or more (e.g., each) OBSS Reporting Field 1 to Field N field may include the information associated with a detected OBSS. One or more (e.g., each) of the OBSS Reporting Field may include one or more of the following subfields: BSS Identifier; ESS Identifier; Coordinator ID; Generation; Color Information; or Operation Channel Info. The BSS Identifier subfield may comprise an identifier of the BSS, such as BSSID, short BSSID, or other type of identifiers of a BSS that may have been previously agreed. The ESS Identifier subfield may comprise an identifier of an ESS, such as a SSID, short SSID, or other type of identifiers of a BSS. The Coordinator ID subfield may comprise an identifier of a coordinator for the BSS and/or the ESS identified. The ID may be implemented as MAC address, IP address, etc. The generation subfield may comprise indications of the generations of BSS identified. Potential values of generation may comprise: 802.11a, 802.11b, 802.11g, 802.11n, 802.11ac, 802.11ah, 802.11af, 802.11ax, etc. The color information subfield may comprise the information of BSS color that may be used by the identified BSS. Potential values may comprise no color and/or integers or bit patterns indicating the color that may be used by the identified BSS. A particular value or bit pattern in this subfield may indicate No Color, or that the identified BSS does not use a Color. The Operation Channel Info subfield may include the operating channel of the identified BSS, such as BSS Operating Width, such as 20 MHz, 40 MHz, 80 MHz, 160 MHz, 80+80 MHz, 1 MHz, 2 MHz, W, W+W, 2W, 4 MHz, 4 W, 2W+2W, 8 MHz, 16 MHz, etc. Primary channel numbers and CCFS-1 information may be included.

The OBSS Reporting (Sub)Element, or a set of fields and/or a subfields, may be implemented as any part of existing element, such as HE Capabilities Element, HE Operation Element, or any part of control, management, extension or null data packet (NDP) frames, or as a part of MAC or physical layer convergence protocol (PLCP) header. For example, a set of the fields or subfields of the OBSS Reporting (Sub)Element may be implemented as a part or subelement of the Neighbor Report, Reduced Neighbor Report, or HE Neighbor Report. For example, one or more of the fields or subfields described herein may be included in an Action frame, Action without ACK frame, or Public Action frame, such as a HE Action frame. Such a frame may be used by a STA to report one or more BSS discovered, which may comprise whether the discovered BSS may be using Color, and which Color value the discovered BSS may be using.

BSS color modification may be provided. An STA may be informed by an AP of the BSS Color that may be being used in the AP's BSS during association. An STA may send an OBSS Reporting Action frame or a frame comprising a OBSS Reporting (Sub)Element; this may be solicited, done periodically or may be unsolicited by the AP, to report that a BSS may be discovered by the STA that may be using the same color. For example, an STA may send an OBSS Reporting Action frame or a frame containing OBSS Reporting (Sub)Element, either solicited, periodically or unsolicited by the AP, to report one or more OBSSs that the STA may have discovered. An AP may have detected that one of its OBSS is using the same color as its own BSS, for example, by detecting an OBSS packet such as beacon, short beacon, data, and control, management or extension packets from an OBSS. The OBSS packet may contain color of the OBSS and/or other identifying information, such as the BSSID, or MAC address of a transmitting STA that does not belong to the AP's own BSS. An AP may choose a different color, for example, when the AP receives, from an STA, an indication that an OBSS may be using the same color as its own BSS. The new color value may be chosen randomly, for example, it may be chosen randomly from a set of colors that may not be used by its direct OBSS. The new color value may be chosen to be the color value that may be used the least by OBSSs in a given area. The AP may announce the change of BSS color using a change of color announcement frame, which may be implemented as a (Sub)Element in the beacon, short beacon, or any part of management, control, extension or NDP frames or as part of MAC/PLCP header.

FIG. 24 illustrates an example a change of color announcement element (e.g., (Sub)Element). As illustrated in FIG. 24, the change of color announcement element (e.g., (Sub)Element) may include one or more of the following fields: (Sub)Element ID; length; new BSS color; or switching time. The (Sub)Element ID field may be an identifier indicating that the current (Sub)Element may be the change of color announcement (Sub)Element. The Length field may comprise the length of the change of color (Sub)Element. The new BSS color may comprise the value of the new color value that may be used by the BSS. The switching time field may indicate the time of the switching to the new BSS Color. For example, the switching time may be implemented as remaining time in time units (TUs) or microseconds, milliseconds, seconds or any other time units until the BSS may switch to the new BSS color value. For example, the switching time may be the timing synchronization function (TSF) value, a partial TSF value, or the absolute time at which the BSS may change to the new BSS color value. The AP and the STAs of the BSS may adapt and/or use the new BSS color value at the indicated switching time and/or when the switching time may have counted down to zero.

One or more APs may use coordination to select a color (e.g., the best color) for their BSS. Coordination may be described herein. An AP may select a new BSS color value through coordination, for example, when newly starting a new BSS, when discovered that an OBSS may be using the same color value as their current BSS, when informed by their STAs that one or more OBSS may be using the same color value as their own BSS, and/or when it experiences interference above a certain threshold level. An AP may select a new BSS color value through coordination, for example, through AP to AP coordination or through coordination through provider coordinators.

An AP or a coordinator may send a coordination request frame/element to one or more (e.g., all) APs/Coordinators, for example, in relevant areas. The coordination request frame may comprise a color value. The coordination request may inquire the colors that may be used by one or more (e.g., all) of the APs/BSSs in the relevant OBSSs.

An AP/Coordinator may respond with a coordination response frame/element, for example, when receiving a coordination request frame/element to coordinate Color values. The coordination response may frame/element may comprise a status whether the proposed color in the coordination request frame is rejected, accepted, or if an alternative values are proposed. The coordination response may comprise the current color value that may be used by the BSS in the responding BSS.

An AP/Coordinator may announce to its BSS or one or more BSSs that the BSSs should switch to a new BSS color value at a provided switching time, for example, using a change of color frame/Element.

Figure 25A:
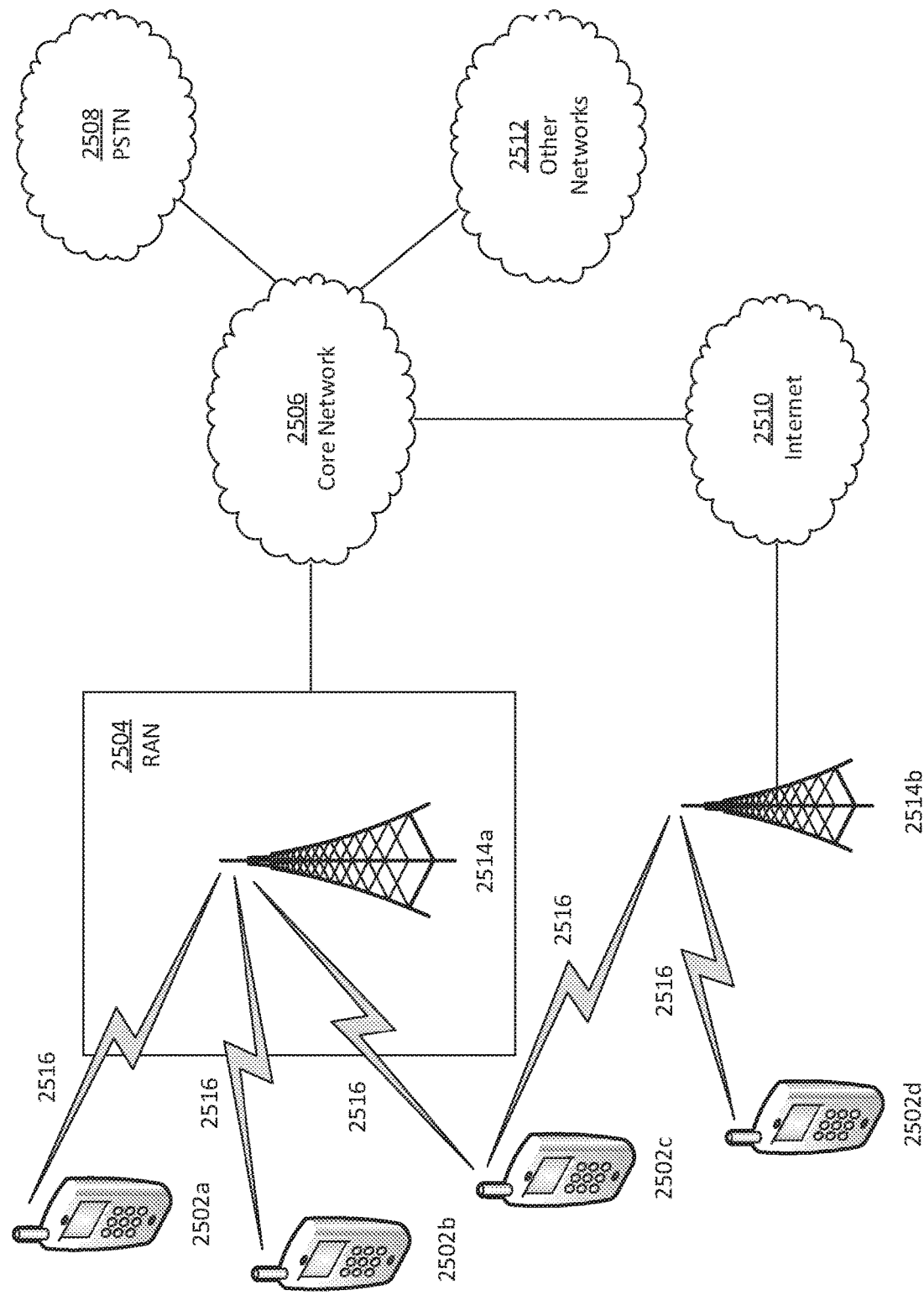
FIG. 25A is a system diagram of an example communications system in which one or more disclosed embodiments may be implemented.

FIG. 25A is a diagram of an example communications system 2500 in which one or more disclosed embodiments may be implemented. The communications system 2500 may be a multiple access system that provides content, such as voice, data, video, messaging, broadcast, etc., to multiple wireless users. The communications system 2500 may enable multiple wireless users to access such content through the sharing of system resources, including wireless bandwidth. For example, the communications systems 2500 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 25A, the communications system 2500 may include at least one wireless transmit/receive unit (WTRU), such as a plurality of WTRUs, for instance WTRUs 2502a, 2502b, 2502c, and 2502d, a radio access network (RAN) 2504, a core network 2506, a public switched telephone network (PSTN) 2508, the Internet 2510, and other networks 2512, though it should be appreciated that the disclosed embodiments contemplate any number of WTRUs, base stations, networks, and/or network elements. Each of the WTRUs 2502a, 2502b, 2502c, 2502d may be any type of device configured to operate and/or communicate in a wireless environment. By way of example, the WTRUs 2502a, 2502b, 2502c, 2502d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 2500 may also include a base station 2514a and a base station 2514b. Each of the base stations 2514a, 2514b may be any type of device configured to wirelessly interface with at least one of the WTRUs 2502a, 2502b, 2502c, 2502d to facilitate access to one or more communication networks, such as the core network 2506, the Internet 2510, and/or the networks 2512. By way of example, the base stations 2514a, 2514b may be a base transceiver station (BTS), a Node-B, an eNode B, a Home Node B, a Home eNode B, a site controller, an access point (AP), a wireless router, and the like. While the base stations 2514a, 2514b are each depicted as a single element, it should be appreciated that the base stations 2514a, 2514b may include any number of interconnected base stations and/or network elements.

The base station 2514a may be part of the RAN 2504, which may also include other base stations and/or network elements (not shown), such as a base station controller (BSC), a radio network controller (RNC), relay nodes, etc. The base station 2514a and/or the base station 2514b may be configured to transmit and/or receive wireless signals within a particular geographic region, which may be referred to as a cell (not shown). The cell may further be divided into cell sectors. For example, the cell associated with the base station 2514a may be divided into three sectors. Thus, in one embodiment, the base station 2514a may include three transceivers, e.g., one for each sector of the cell. In another embodiment, the base station 2514a may employ multiple-input multiple output (MIMO) technology and, therefore, may utilize multiple transceivers for each sector of the cell.

The base stations 2514a, 2514b may communicate with one or more of the WTRUs 2502a, 2502b, 2502c, 2502d over an air interface 2516, which may be any suitable wireless communication link (e.g., radio frequency (RF), microwave, infrared (IR), ultraviolet (UV), visible light, etc.). The air interface 2516 may be established using any suitable radio access technology (RAT).

More specifically, as noted above, the communications system 2500 may be a multiple access system and may employ one or more channel access schemes, such as CDMA, TDMA, FDMA, OFDMA, SC-FDMA, and the like. For example, the base station 2514a in the RAN 2504 and the WTRUs 2502a, 2502b, 2502c may implement a radio technology such as Universal Mobile Telecommunications System (UMTS) Terrestrial Radio Access (UTRA), which may establish the air interface 2516 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 2514a and the WTRUs 2502a, 2502b, 2502c may implement a radio technology such as Evolved UMTS Terrestrial Radio Access (E-UTRA), which may establish the air interface 2516 using Long Term Evolution (LTE) and/or LTE-Advanced (LTE-A).

In other embodiments, the base station 2514a and the WTRUs 2502a, 2502b, 2502c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 2514b in FIG. 25A may comprise a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 2514b and the WTRUs 2502c, 2502d may implement a radio technology such as IEEE 802.11 to establish a wireless local area network (WLAN). In another embodiment, the base station 2514b and the WTRUs 2502c, 2502d may implement a radio technology such as IEEE 802.15 to establish a wireless personal area network (WPAN). In yet another embodiment, the base station 2514b and the WTRUs 2502c, 2502d may utilize a cellular-based RAT (e.g., WCDMA, CDMA2000, GSM, LTE, LTE-A, etc.) to establish a picocell or femtocell. As shown in FIG. 25A, the base station 2514b may have a direct connection to the Internet 2510. Thus, the base station 2514b may not be required to access the Internet 2510 via the core network 2506.

The RAN 2504 may be in communication with the core network 2506, which may be any type of network configured to provide voice, data, applications, and/or voice over internet protocol (VoIP) services to one or more of the WTRUs 2502a, 2502b, 2502c, 2502d. For example, the core network 2506 may provide call control, billing services, mobile location-based services, pre-paid calling, Internet connectivity, video distribution, etc., and/or perform high-level security functions, such as user authentication. Although not shown in FIG. 25A, it should be appreciated that the RAN 2504 and/or the core network 2506 may be in direct or indirect communication with other RANs that employ the same RAT as the RAN 2504 or a different RAT. For example, in addition to being connected to the RAN 2504, which may be utilizing an E-UTRA radio technology, the core network 2506 may also be in communication with another RAN (not shown) employing a GSM radio technology.

The core network 2506 may also serve as a gateway for the WTRUs 2502a, 2502b, 2502c, 2502d to access the PSTN 2508, the Internet 2510, and/or other networks 2512. The PSTN 2508 may include circuit-switched telephone networks that provide plain old telephone service (POTS). The Internet 2510 may include a global system of interconnected computer networks and devices that use common communication protocols, such as the transmission control protocol (TCP), user datagram protocol (UDP) and the internet protocol (IP) in the TCP/IP internet protocol suite. The networks 2512 may include wired or wireless communications networks owned and/or operated by other service providers. For example, the networks 2512 may include another core network connected to one or more RANs, which may employ the same RAT as the RAN 2504 or a different RAT.

Some or all of the WTRUs 2502a, 2502b, 2502c, 2502d in the communications system 2500 may include multi-mode capabilities, e.g., the WTRUs 2502a, 2502b, 2502c, 2502d may include multiple transceivers for communicating with different wireless networks over different wireless links. For example, the WTRU 2502c shown in FIG. 25A may be configured to communicate with the base station 2514*a*, which may employ a cellular-based radio technology, and with the base station 2514*b*, which may employ an IEEE 802 radio technology.

Figure 25B:
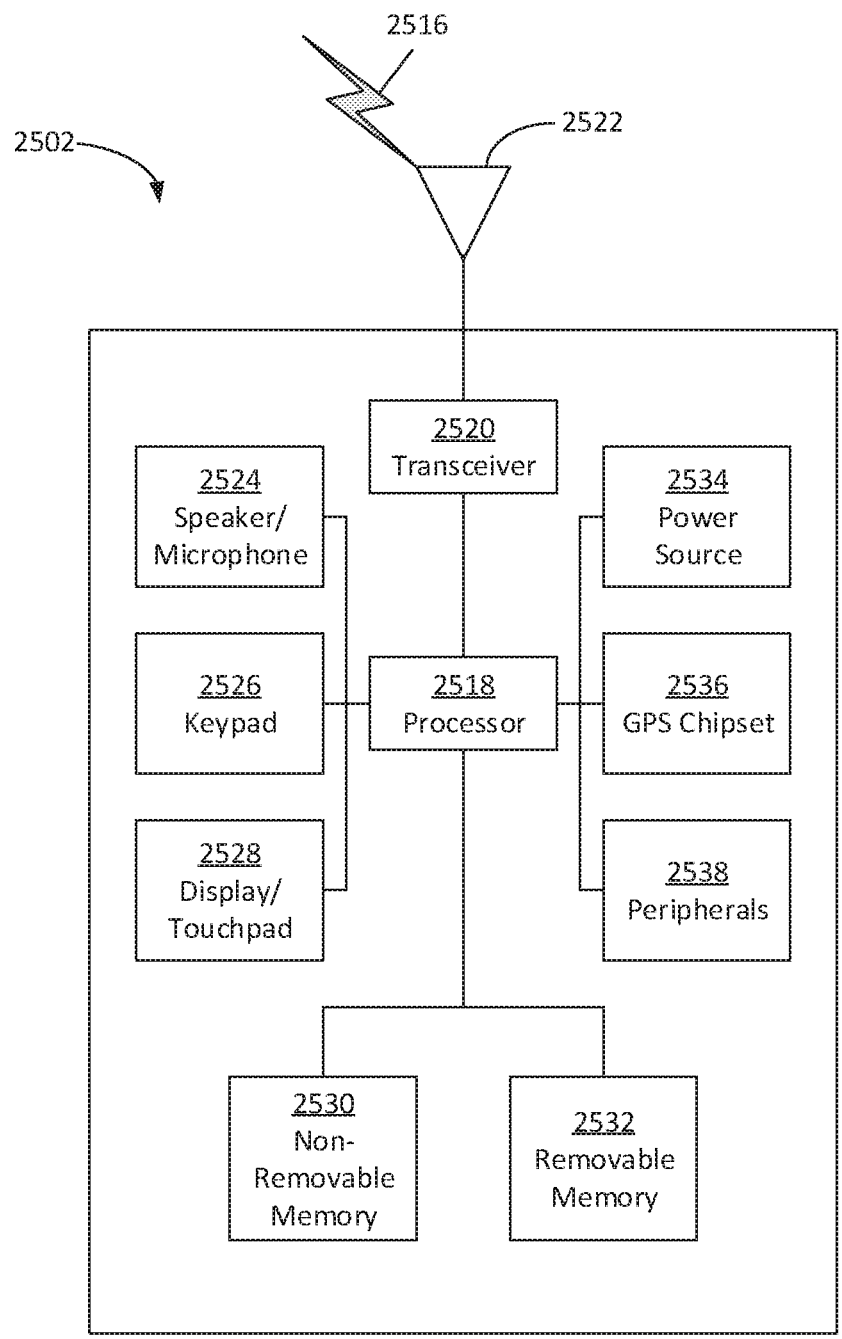
FIG. 25B is a system diagram of an example wireless transmit/receive unit (WTRU) that may be used within the communications system illustrated in FIG. 25A.

FIG. 25B is a system diagram of an example WTRU 2502. As shown in FIG. 25B, the WTRU 2502 may include a processor 2518, a transceiver 2520, a transmit/receive element 2522, a speaker/microphone 2524, a keypad 2526, a display/touchpad 2528, non-removable memory 2530, removable memory 2532, a power source 2534, a global positioning system (GPS) chipset 2536, and other peripherals 2538. It should be appreciated that the WTRU 2502 may include any sub-combination of the foregoing elements while remaining consistent with an embodiment.

The processor 2518 may comprise a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2518 may perform signal coding, data processing, power control, input/output processing, and/or any other functionality that enables the WTRU 2502 to operate in a wireless environment. The processor 2518 may be coupled to the transceiver 2520, which may be coupled to the transmit/receive element 2522. While FIG. 25B depicts the processor 2518 and the transceiver 2520 as separate components, it should be appreciated that the processor 2518 and the transceiver 2520 may be integrated together in an electronic package or chip.

The transmit/receive element 2522 may be configured to transmit signals to, or receive signals from, a base station (e.g., the base station 2514*a*) over the air interface 2516. For example, in one embodiment, the transmit/receive element 2522 may be an antenna configured to transmit and/or receive RF signals. In another embodiment, the transmit/receive element 2522 may be an emitter/detector configured to transmit and/or receive IR, UV, or visible light signals, for example. In yet another embodiment, the transmit/receive element 2522 may be configured to transmit and receive both RF and light signals. It should be appreciated that the transmit/receive element 2522 may be configured to transmit and/or receive any combination of wireless signals.

In addition, although the transmit/receive element 2522 is depicted in FIG. 25B as a single element, the WTRU 2502 may include any number of transmit/receive elements 2522. More specifically, the WTRU 2502 may employ MIMO technology. Thus, in one embodiment, the WTRU 2502 may include two or more transmit/receive elements 2522 (e.g., multiple antennas) for transmitting and receiving wireless signals over the air interface 2516.

The transceiver 2520 may be configured to modulate the signals that are to be transmitted by the transmit/receive element 2522 and to demodulate the signals that are received by the transmit/receive element 2522. As noted above, the WTRU 2502 may have multi-mode capabilities. Thus, the transceiver 2520 may include multiple transceivers for enabling the WTRU 2502 to communicate via multiple RATs, such as UTRA and IEEE 802.11, for example.

The processor 2518 of the WTRU 2502 may be coupled to, and may receive user input data from, the speaker/microphone 2524, the keypad 2526, and/or the display/touchpad 2528 (e.g., a liquid crystal display (LCD) display unit or organic light-emitting diode (OLED) display unit). The processor 2518 may also output user data to the speaker/microphone 2524, the keypad 2526, and/or the display/touchpad 2528. In addition, the processor 2518 may access information from, and store data in, any type of suitable memory, such as the non-removable memory 2530 and/or the removable memory 2532. The non-removable memory 2530 may include random-access memory (RAM), read-only memory (ROM), a hard disk, or any other type of memory storage device. The removable memory 2532 may include a subscriber identity module (SIM) card, a memory stick, a secure digital (SD) memory card, and the like. In other embodiments, the processor 2518 may access information from, and store data in, memory that is not physically located on the WTRU 2502, such as on a server or a home computer (not shown).

The processor 2518 may receive power from the power source 2534, and may be configured to distribute and/or control the power to the other components in the WTRU 2502. The power source 2534 may be any suitable device for powering the WTRU 2502. For example, the power source 2534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 2518 may also be coupled to the GPS chipset 2536, which may be configured to provide location information (e.g., longitude and latitude) regarding the current location of the WTRU 2502. In addition to, or in lieu of, the information from the GPS chipset 2536, the WTRU 2502 may receive location information over the air interface 2516 from a base station (e.g., base stations 2514*a*, 2514*b*) and/or determine its location based on the timing of the signals being received from two or more nearby base stations. It should be appreciated that the WTRU 2502 may acquire location information by way of any suitable location-determination method while remaining consistent with an embodiment.

The processor 2518 may further be coupled to other peripherals 2538, which may include one or more software and/or hardware modules that provide additional features, functionality and/or wired or wireless connectivity. For example, the peripherals 2538 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements are described above in particular combinations, one of ordinary skill in the art will appreciate that each feature or element may be used alone or in any combination with the other features and elements. Other than the 802.11 protocols described herein, the features and elements described herein may be applicable to other wireless systems. Although the features and elements described herein may have been described for uplink operation, the methods and procedures may be applied to downlink operation. Although SIFS may have been used herein to indicate various inter frame spacing, other inter frame spacing, e.g., RIFS or other agreed time interval may be applied. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

The invention claimed is:

1. A station (STA) comprising:
a processor; and
a transceiver,
the processor and the transceiver configured to:
    receive, from an access point (AP) that the STA is associated with, an indication of a first basic service set (BSS) color associated with the AP;
    receive, from the AP that the STA is associated with, a request frame that the STA gather BSS color information of a plurality of overlapping BSSs (OBSSs);
    receive, from one or more of a plurality of APs associated with the plurality of OBSSs, a beacon that includes a SIG field in a physical (PHY) layer preamble indicating a respective BSS color;
    transmit, in response to the request frame, one or more HE operation elements that include gathered BSS color information of the plurality of OBSSs, wherein the gathered BSS color information includes a BSS color of each of the plurality of OBSSs;
    receive, from the AP in the BSS that the STA is associated with, a BSS color change announcement element that includes a BSS color information field and a color switching time field, wherein the BSS color information field indicates a second BSS color determined based on the first BSS color of the AP and the transmitted BSS color information of the plurality of OBSSs, and the color switching time field indicates when the AP will switch to the second BSS color; and
    use the second BSS color in a SIG field of a PHY layer preamble of packets communicated to the AP after the AP switches to the second BSS color.

2. The STA of claim 1, wherein the processor and the transceiver are further configured to transmit, to the AP, an event report indicating that a BSS color collision is detected by the STA based on a same BSS color of at least one of the plurality of OBSSs.

3. The STA of claim 2, wherein the event report further comprises information of the plurality of OBSSs associated with a plurality of neighboring APs detected by the STA.

4. The STA of claim 2, wherein the event report is sent by the STA in an unsolicited manner.

5. The STA of claim 2, wherein the BSS color change announcement element is received as a response to the event report.

6. A method performed by a station (STA), the method comprising:
    receiving, from an access point (AP) that the STA is associated with, an indication of a first basic service set (BSS) color associated with the AP;
    receiving, from the AP that the STA is associated with, a request frame that the STA gather BSS color information of a plurality of overlapping BSSs (OBSSs);
    receiving, from one or more of a plurality of APs associated with the plurality of OBSSs, a beacon that includes a SIG field in a physical (PHY) layer preamble indicating a respective BSS color;
    transmitting, in response to the request frame, one or more HE operation elements that include the gathered BSS color information of the plurality of OBSSs, wherein the gathered BSS color information includes a BSS color of each of the plurality of OBSSs;
    receiving, from the AP in the BSS that the STA is associated with, a BSS color change announcement element that includes a BSS color information field and a color switching time field, wherein the BSS color information field indicates a second BSS color determined based on the first BSS color of the AP and the transmitted BSS color information of the plurality of OBSSs, and the color switching time field indicates when the AP will switch to the second BSS color; and
    using the second BSS color in a SIG field of a physical (PHY) layer preamble of packets communicated to the AP after the AP switches to the second BSS color.

7. The method of claim 6, further comprising:
    transmitting, to the AP, an event report indicating that a BSS color collision is detected by the STA based on a same BSS color of at least one of the plurality of OBSSs.

8. The method of claim 7, wherein the event report further comprises information of the plurality of OBSSs associated with a plurality of neighboring APs detected by the STA.

9. The method of claim 7, wherein the event report is sent by the STA in an unsolicited manner.

10. The method of claim 7, wherein the BSS color change announcement element is received as a response to the event report.

* * * * *